United States Patent

(12) United States Patent
Hofman

(10) Patent No.: US 12,534,892 B2
(45) Date of Patent: Jan. 27, 2026

(54) EXTENDABLE ARM MOUNT FOR SHOWERHEAD ASSEMBLIES

(71) Applicant: ETL, LLC, Reno, NV (US)

(72) Inventor: David Hofman, Reno, NV (US)

(73) Assignee: ETL, LLC, Reno, NV (US)

( * ) Notice: Subject to any disclaimer, the term of this patent is extended or adjusted under 35 U.S.C. 154(b) by 249 days.

(21) Appl. No.: 18/383,001

(22) Filed: Oct. 23, 2023

(65) Prior Publication Data

US 2025/0129585 A1 Apr. 24, 2025

(51) Int. Cl.
*E03C 1/06* (2006.01)
*B05B 1/16* (2006.01)
*B05B 1/18* (2006.01)
*E03C 1/04* (2006.01)

(52) U.S. Cl.
CPC .............. *E03C 1/06* (2013.01); *B05B 1/16* (2013.01); *B05B 1/185* (2013.01); *E03C 1/0408* (2013.01); *E03C 1/0409* (2013.01)

(58) Field of Classification Search
CPC ........ E03C 1/06; E03C 1/0408; E03C 1/0409; B05B 1/16; B05B 1/185
USPC ............... 239/281, 525, 530, 548, 552, 556, 239/587.1–588, 600
See application file for complete search history.

(56) References Cited

U.S. PATENT DOCUMENTS

| | | | |
|---|---|---|---|
| 7,360,723 B2 * | 4/2008 | Lev | B05B 1/16 239/587.1 |
| 7,665,676 B2 | 2/2010 | Lev | |
| 7,866,576 B1 * | 1/2011 | Farley | E03C 1/0409 239/587.5 |
| 7,966,677 B2 | 6/2011 | Miller et al. | |
| 8,683,624 B1 * | 4/2014 | Zhadanov | E03C 1/025 4/615 |
| 9,919,331 B2 | 3/2018 | Scheffer et al. | |
| 10,215,309 B2 * | 2/2019 | Leber | B05B 15/65 |
| 12,091,846 B2 * | 9/2024 | Xie | E03C 1/06 |
| 2019/0176170 A1 | 6/2019 | Lee et al. | |
| 2022/0126310 A1 | 4/2022 | Dai et al. | |
| 2023/0175240 A1 * | 6/2023 | Yan | E03C 1/0408 239/281 |

FOREIGN PATENT DOCUMENTS

| | | |
|---|---|---|
| CN | 106076677 A | 11/2016 |
| CN | 218204730 U | 1/2023 |

* cited by examiner

*Primary Examiner* — Steven J Ganey
(74) *Attorney, Agent, or Firm* — ONE LLP

(57) ABSTRACT

A showerhead assembly is provided which includes an arm mount assembly for releasably and/or extendably holding a handheld showerhead. The arm mount assembly includes one or more shoulder portions and a movable arm portion. The arm mount assembly comprises a coupler, a second shoulder outlet, and a connection end. The connection end is configured to couple with the handheld showerhead by a rear side or proximal end thereof, or an adapter operatively coupled therewith. The means for coupling can include magnets, a hook and loop mechanism, or a ball joint connection. In addition, a spring-button tab mechanism can be utilized for managing the operative engagement and disengagement of the arm mount assembly with the handheld showerhead. The arm mount assembly provides for a wide range of adjustability of the showerhead assembly, such as panning, swiveling, tilting, and/or rotation of the handheld showerhead.

13 Claims, 15 Drawing Sheets

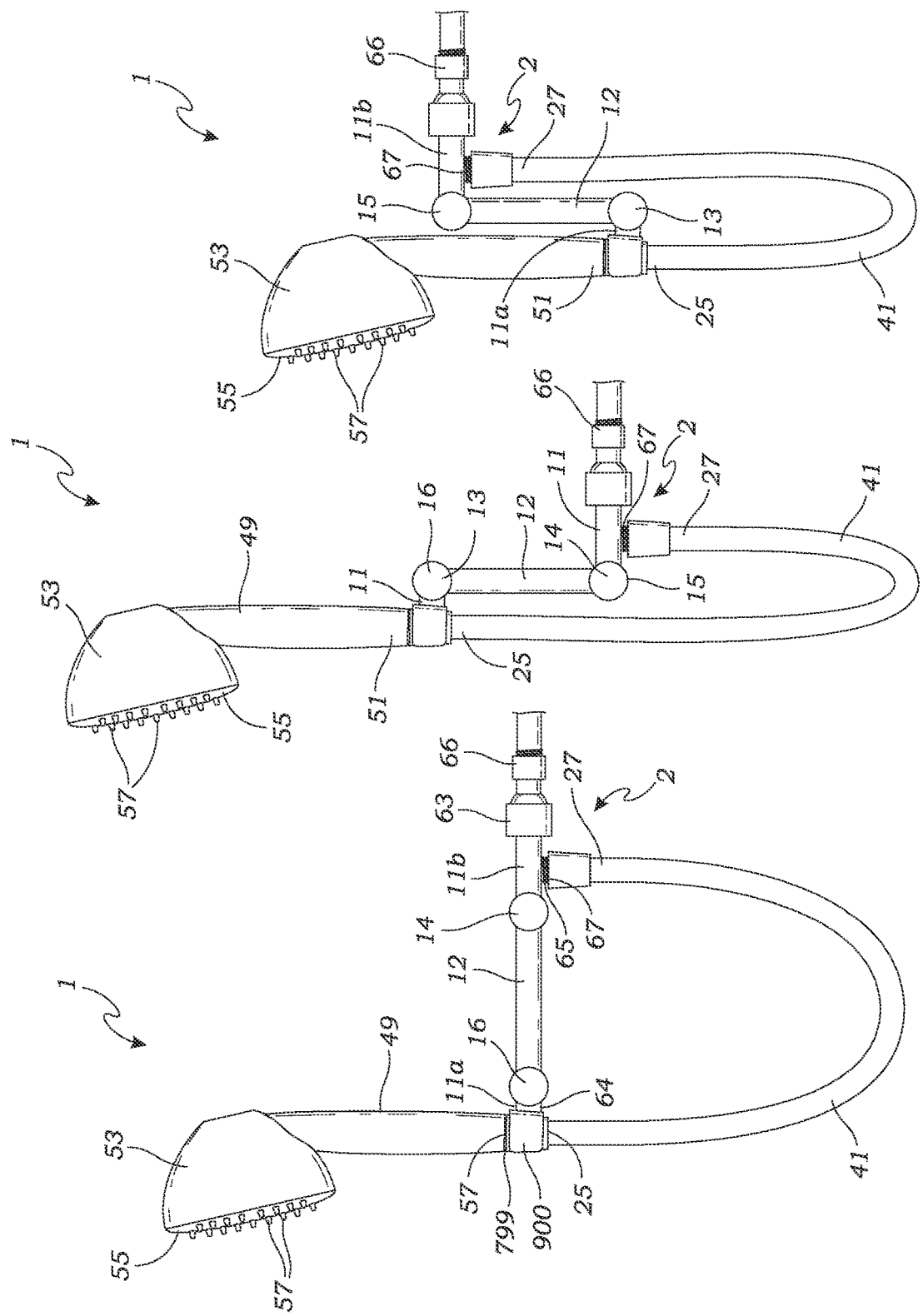

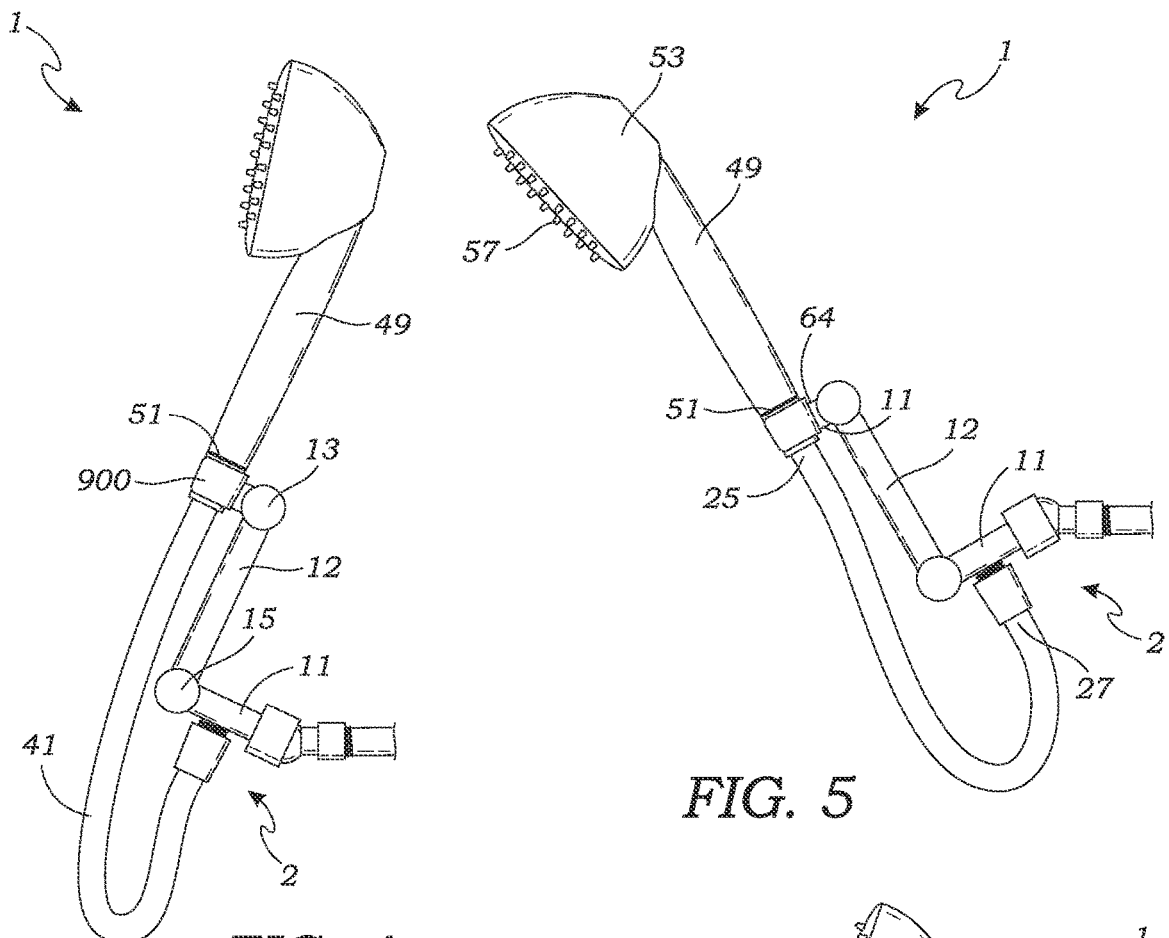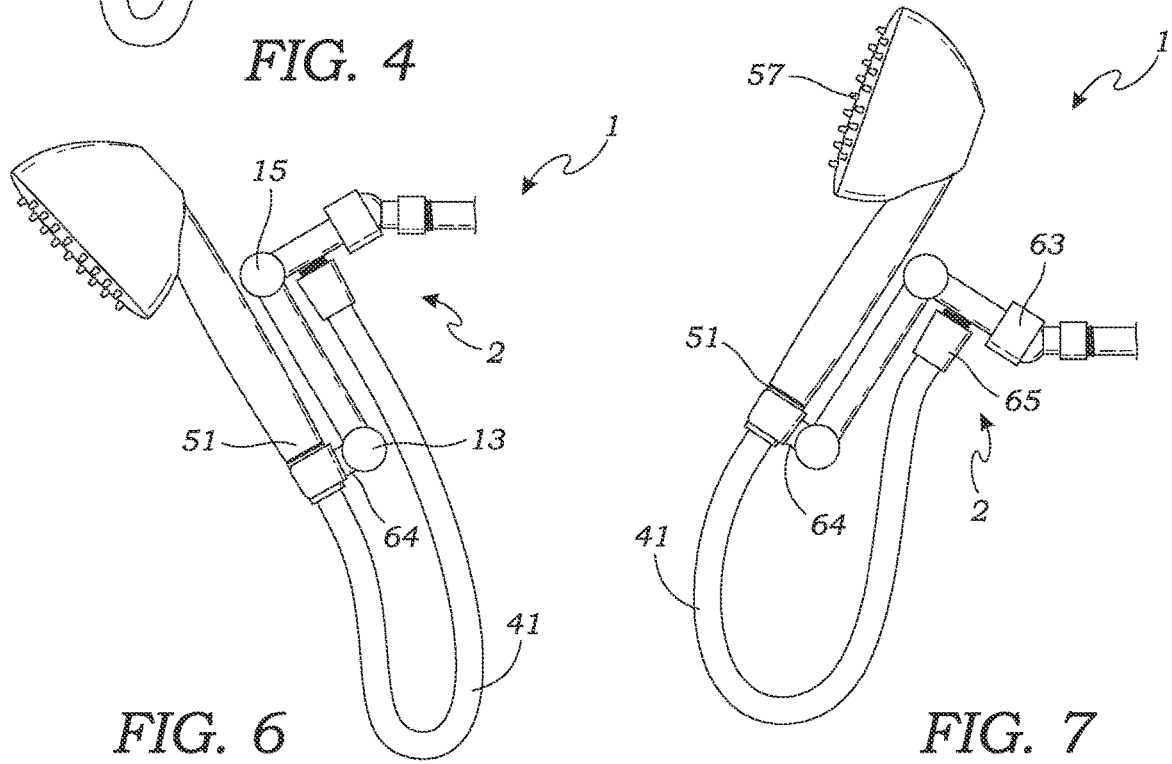

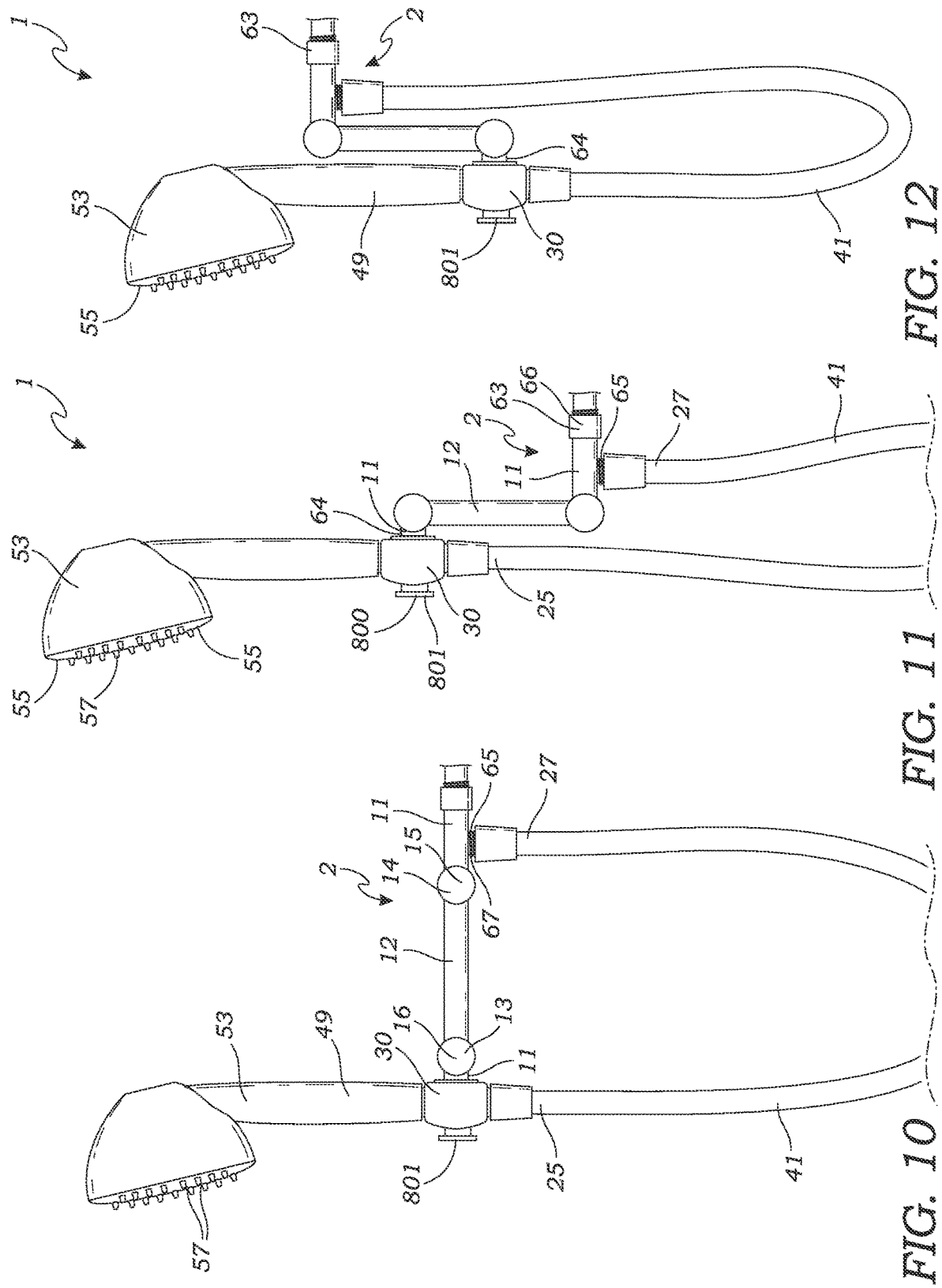

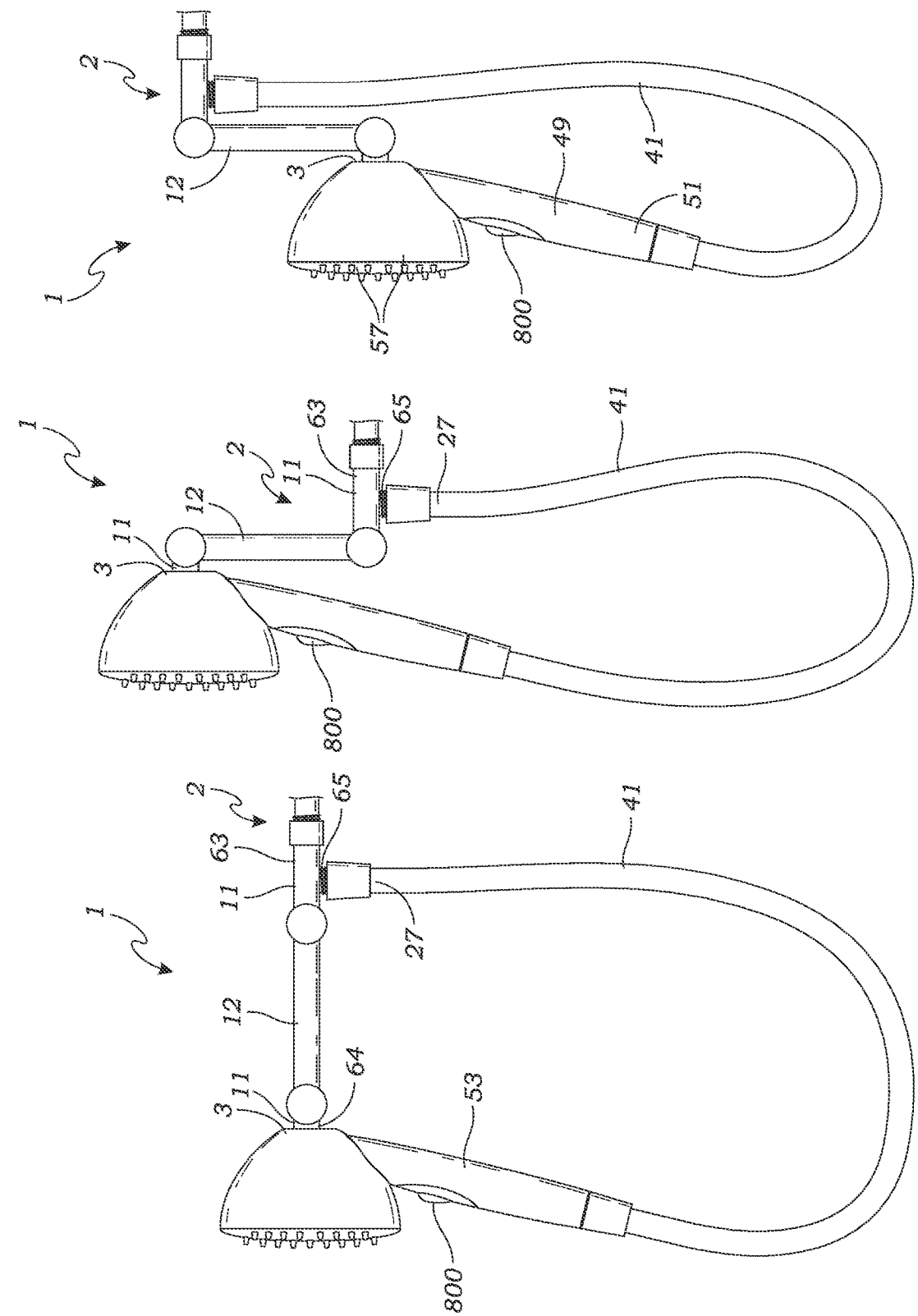

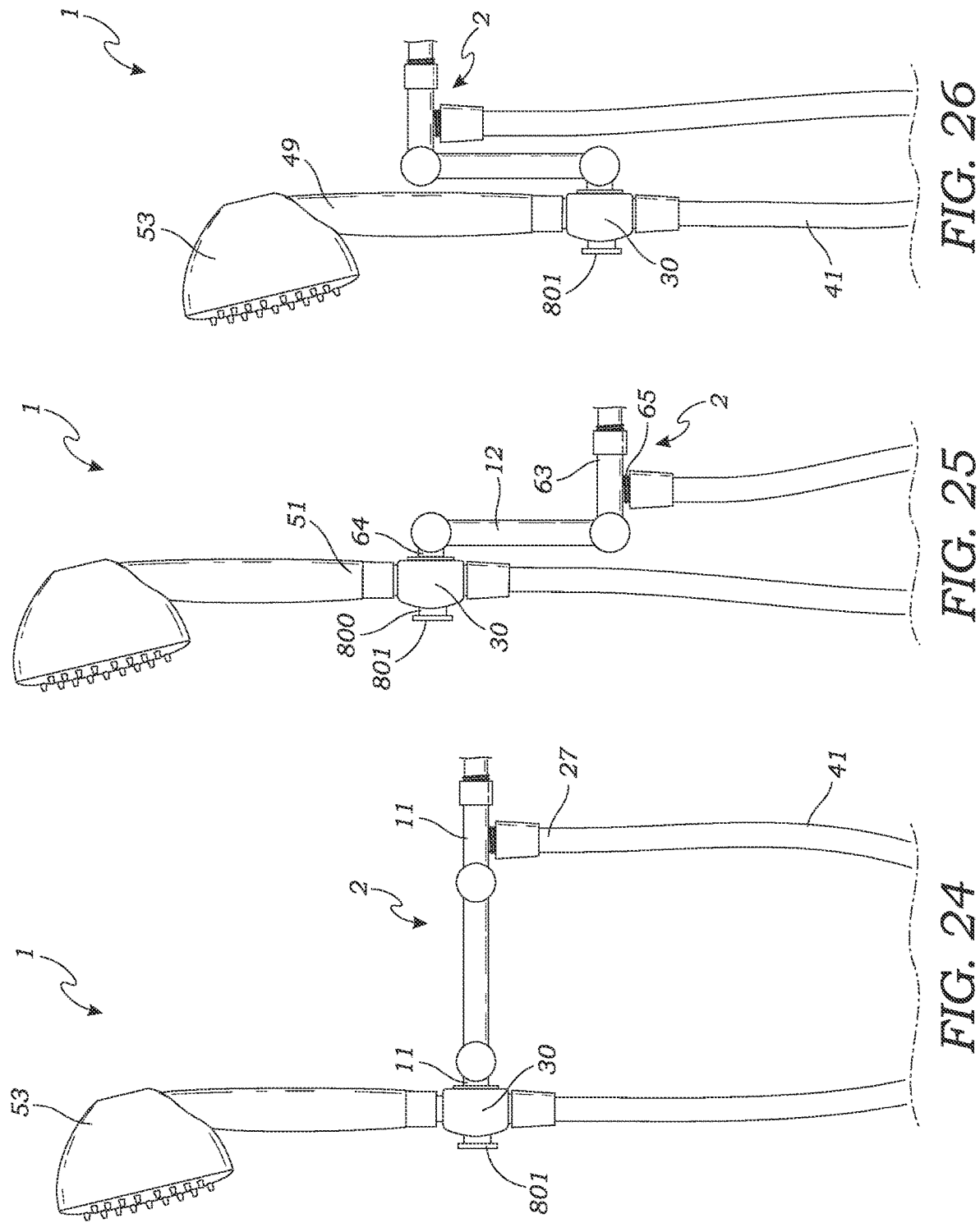

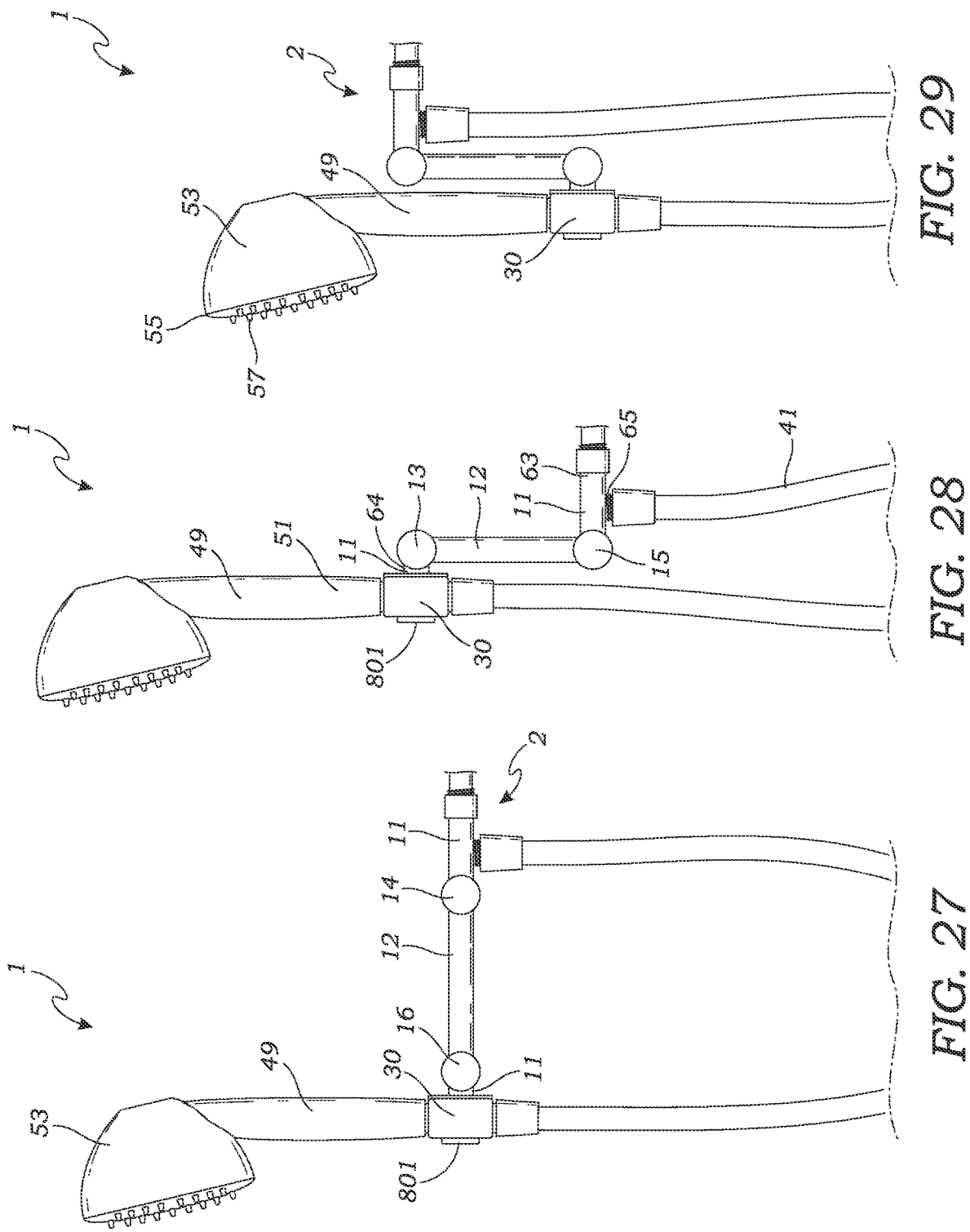

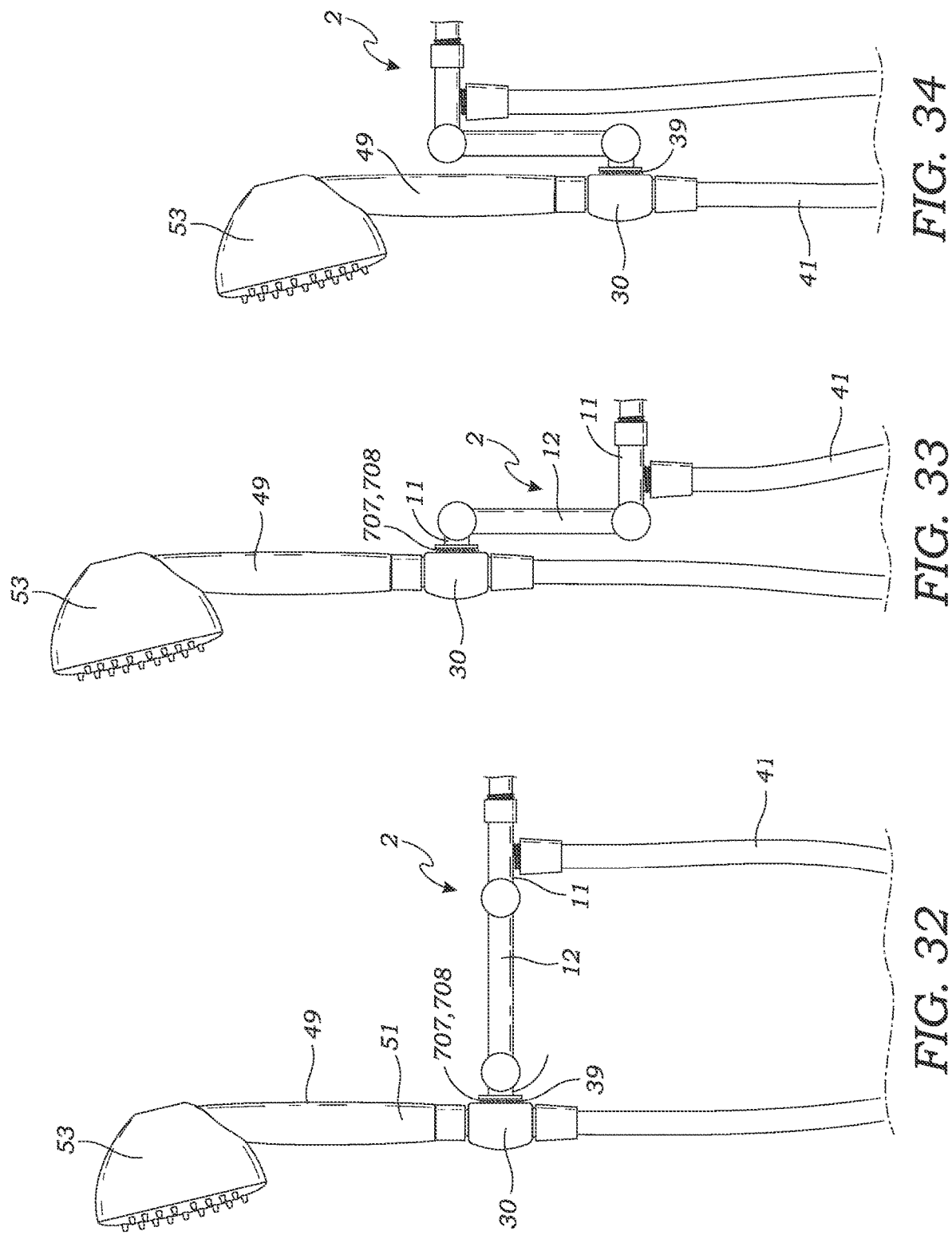

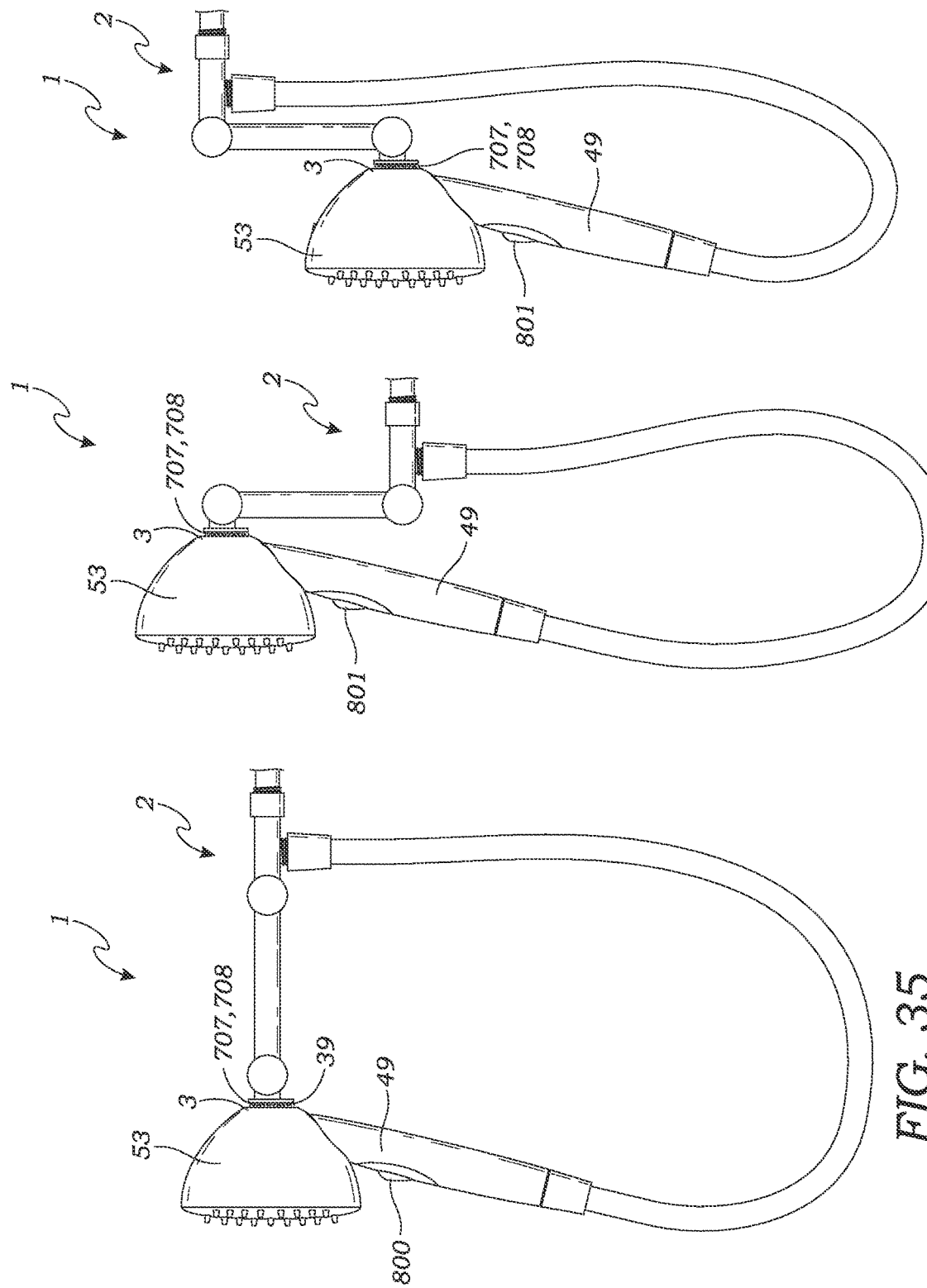

EXTENDABLE ARM MOUNT FOR SHOWERHEAD ASSEMBLIES

BACKGROUND OF THE INVENTION

The present invention relates to showerheads. More particularly, the present invention relates to arm mounts that can be used with handheld showerheads.

Showerheads are commercially available in numerous designs and configurations for use in showers, faucets, spas, sprinklers and other personal and industrial systems. The vast majority of showerheads include spray heads which may be categorized as being either stationary or oscillating and have either fixed or adjustable openings. Stationary spray heads with fixed jets are the simplest constructions consisting essentially of a central channel connected to one or more spray nozzles directed to produce a constant pattern. Multi-function spray heads are able to deliver water in different spray patterns such as a fine spray, a coarse spray, a pulsating spray, or even a flood pattern producing a high fluid flow.

A handheld showerhead assembly typically includes a hollow handle connected to a water supply by a flexible rubber hose. The handle has a proximal end which typically has a threaded inlet for connecting to the rubber hose. Meanwhile, at the handle's distal end, the showerhead assembly includes a showerhead including a plurality of nozzles for ejecting water. Typically, the handle and showerhead face are angled relative to one another so that water is ejected at approximately 90 degrees relative to the handle's longitudinal axis.

Advantageously, the showerhead handle allows users to manipulate the spray nozzles into various positions and alignment to assist in the cleaning process. Unfortunately, though handheld showerheads provide many advantages compared to their fixed showerhead counterpart, handheld showerheads suffer from several disadvantages. For example, Chinese Publication No. 218204730, U.S. Pat. No. 9,919,331 and Chinese Patent No. 106076677 describes handheld showerhead assemblies that utilize a magnetic docking or attachment mechanism. Further, U.S. Patent Publication No. 2022/0126310 and Chinese Patent Publication No. 112934494 describe handheld showerheads which include a magnetic coupler so as to affix the showerhead in an aligned condition. In these embodiments, the magnet retention mechanism may be unsecure, causing the handheld showerhead to inadvertently release from its desired attached position.

Additionally, many showerhead assemblies include handheld showerheads which insert or slide into a given slot or bracket. Examples of such constructions are disclosed in U.S. Pat. Nos. 7,966,677; 7,665,676; and U.S. Patent Publication No. 2019/0176170. However, none of these embodiments disclose a handheld assembly that utilizes a rotatable, movable, or extendable attachment mechanism.

Many of these embodiments disclose a handheld showerhead assembly that is fixed in its mount position. Thus, it would be advantageous to provide a showerhead assembly that included a firm fastener which would allow the user to manipulate or change the angle and/or positioning of the handheld showerhead.

Traditionally, handheld showerhead assemblies attach to the arm mount using the hose connection. Unfortunately, this elevates the positioning of the showerhead and could be problematic for users with short height, low ceilings, or high shower arms. Thus, it would be further advantageous to provide a showerhead assembly that connected to the arm mount at a various positions, such as the back of the handheld showerhead, or an adapter operatively coupled with the handheld showerhead so as to provide the user the option to select the handheld showerhead's position and height.

SUMMARY OF THE INVENTION

The present invention addresses the aforementioned disadvantages by providing an improved showerhead assembly which includes an arm mount assembly for movably and extendably supporting a handheld showerhead. The arm assembly includes one or more shoulder portions and a movable arm portion. The showerhead assembly includes a handheld showerhead having a plurality of nozzles for expelling water such as within a shower.

Specifically, the handheld showerhead includes a showerhead and a hollow handle that extends downwardly from showerhead. Further, the hollow handle comprises a proximal end which, in some embodiments, is threaded for connecting to an adapter or a flexible hose. The handle is elongate so as to define a longitudinal axis, and preferably, the distal end of the handle affixes to the showerhead at an angle, such as 45° to 90°. Additionally, the handheld showerhead includes a channel having an inlet for receiving water for being expelled from the showerhead nozzles. Various channel, conduit and nozzle constructions can be determined by those skilled in the art for diverting water from the inlet to the showerhead's nozzles.

Preferably, the arm mount assembly includes a first shoulder and a second shoulder, wherein the arm portion is positioned therebetween. The second shoulder is hollow so as to include a central conduit. Moreover, the arm portion can be operatively coupled with the first shoulder by a first attachment point and with the second shoulder by a second attachment point. More specifically, the arm portion can be movably attached to the first attachment point by a first joint and the second attachment point by a second joint. In this manner, the arm portion can move with a wide range of adjustability, including but not limited to, panning, swiveling, tilting, and/or rotation (e.g., an upward or downward angled movement, or frontward and backward angled movement).

In preferred embodiments, the arm mount assembly further includes a connection end configured to connect to the handheld showerhead, a coupler configured to connect to and be in fluid communication with a pipe of a water source, and a second shoulder outlet in fluid communication with the flexible hose and coupler. In some embodiments, the connection end is disposed along or extends from the first shoulder, and the coupler and second shoulder outlet are disposed along or extend from the second shoulder. Preferably, water is transported from a primary conduit in the coupler and through the central conduit of the second shoulder so as to be transported to the flexible hose 41 by way of the second shoulder outlet. In this manner, water is ultimately transported form the pipe of a water source to the handheld showerhead for expellation from nozzles.

Preferably, the connection end includes a coupling structure for removably and operatively coupling with the handheld showerhead. Specifically, the handheld showerhead comprises a showerhead engagement surface configured to engage with the coupling structure. More specifically, the showerhead engagement surface engages with a connection point on the coupling structure. In some embodiments, the handheld showerhead comprises a cavity which includes the showerhead engagement surface. In some preferred embodiments, the cavity is disposed on a rear side of the handheld showerhead. In some preferred embodiments, the cavity is disposed on a proximal end of the handheld showerhead. In some preferred embodiments, the cavity is disposed on the adapter which is operatively coupled with the handheld showerhead.

Specifically, in some embodiments, the adapter is coupled with and in fluid communication with the flexible hose, which is coupled with and in fluid communication with the second shoulder outlet that connects to the coupler in fluid communication with the water source. As such, in some embodiments, water travels from the hose to a passageway in the adapter 30 so as to pass through the central channel within the handle and, ultimately, expel from the nozzles of the handheld showerhead.

Further, in some embodiments, the cavity of the cavity is a substantially spherical cavity. A "substantially spherical cavity" is defined as having a substantial portion of its surface as having a spherical or curved shape. However, "substantially spherical cavity" is intended to be interpreted broadly such that the entire cavity need not have concave surface. For example, the substantially spherical cavity may include a portion of the surface that is planar such as to form a frusto-spherical shape. In preferred embodiments, the cavity comprises curved top and bottom edges, and flat edges. In this regard, the flat edges are configured to be complementary to the flat sides of an arm mount engagement surface on the connection end of the arm mount assembly. The flat geometry of the arm mount engagement surface and the cavity provides for improved fastening means between the arm mount assembly and handheld showerhead (or the adapter attached to the handheld showerhead).

Moreover, in some embodiments, the coupling structure further includes an alignment surface axially extending therefrom. Further, the alignment surface can include an outer perimeter that is complementary to a largest perimeter of the cavity so as to be received thereby and further secure the connection between the handheld showerhead (or the adapter attached to the handheld showerhead) and the coupling structure of the arm mount assembly.

In preferred embodiments, the coupling structure further includes an attachment means or fastener. Preferably, the cavity includes a corresponding attachment means that couples with the fastener of the coupling structure. In some preferred embodiments the cavity includes a reciprocal magnet or first magnet, and the coupling structure includes a connector magnet or second magnet. In these embodiments, the handheld showerhead is securely and operatively coupled with the coupling structure of the arm mount assembly by attraction of the connector magnet and the reciprocal magnet. In some embodiments, the connector magnet is a magnetic disk disposed on the arm mount engagement surface and defining the connection point. In some embodiments, the reciprocal magnet is a complementary magnetic disk protruding from a planar showerhead engagement surface within the cavity.

In other preferred embodiments, the coupling structure can include a ball extending therefrom which comprises the arm mount engagement surface and defines the connection point that interfaces with the cavity of the handheld showerhead. In these embodiments, the cavity includes a planar surface and a tension pin which axially protrudes from the cavity's planar surface. The tension pin is sized and configured to engage with the coupling structure's ball when the ball is positioned within the cavity. In some embodiments, the ball has a distal end that can comprise a preliminary alignment chamber which houses a locking chamber axially aligned therein. Specifically, the tension pin engages with the ball's locking chamber so as to prevent over-rotation of the ball joint or inadvertent release of the handheld showerhead (or the adapter connected with the handheld showerhead). Additionally, the tension pin engages with the ball's preliminary alignment chamber to further stabilize and secure the connection realized between the handheld showerhead (or the adapter coupled with the handheld showerhead) and coupling structure of the arm mount assembly. Additional or alternative ball joint assemblies for providing these capabilities can be selected by those skilled in the art.

In yet other preferred embodiments, the arm mount assembly can include a hook and loop coupling mechanism to releasably and movably affix the handheld showerhead (or the adapter coupled with the handheld showerhead) to the coupling structure of the arm mount. In these embodiments, the coupling structure can include a hook portion, and the cavity can include the corresponding loop portion, or vice versa. In some embodiments, the hook or loop portions can be disposed on the arm mount engagement surface on the coupling structure and define the connection point.

Further, in some preferred embodiments, the arm mount assembly can include an adhesive coupling mechanism, such as Velcro, that can be utilized to releasably and movably affix the handheld showerhead (or the adapter coupled with the handheld showerhead) to the coupling structure of the arm mount.

In some preferred embodiments, the arm mount assembly includes a spring-loaded button and tab mechanism. Specifically, the handheld showerhead (or the adapter coupled with the handheld showerhead) can be securely connected to the coupling structure of the arm mount by a function of the spring-loaded button and tab mechanism. Preferably, in some embodiments, the button extends from the adapter, e.g., its front end. More preferably, the button is coupled with and fits on the tab, which is connected to a body of the cavity. In other embodiments, the button extends from a front side or the rear side of the handheld showerhead.

In preferred embodiments, the body of the cavity comprises an upper body portion having a first spring and a lower body portion having a second spring, wherein the upper body portion and lower body portion are configured to transition between a contracted position and an expanded position in response to movement of the tab. Preferably, the tab is configured to pivotally move in an inward and outward trajectory relative to the body. More preferably, as a force is exerted on the button, the tab is configured to move in an inward direction towards the body. As a result, the first spring and second spring compress, thereby causing the upper body portion and lower body portion to move to the expanded position. In the expanded position, the upper body portion is moved in an upward position and the lower body portion is moved in a downward position. In other words, the upper body portion and lower body portion both move in a direction away from a central axis of the body.

Additionally, and upon release of the button or a force opposite to that which caused the tab to move in an inward direction, the tab is configured to pivot in an outward direction. In this manner, the first spring and second spring decompress, and the upper body portion and lower body portion move to the contracted position. As such, the upper body portion moves in a downward direction and the lower body portion moves in an upward position. In other words, the upper body portion and lower body portion both move towards the central axis of the body.

In preferred embodiments, an upper clasp and lower clasp protrude from the cavity when the upper body portion and lower body portion are in the contracted position. In this manner, the clasps grip the coupling structure's connection point and secure the connection realized between the coupling structure and handheld showerhead (or the adapter, which is coupled with the handheld showerhead). Further, in the expanded position, the upper clasp and lower clasp are disposed entirely within the housing and configured such that they are not protruding from the cavity. As a result, the handheld showerhead can be operatively released from the coupling structure so as to allow the handheld showerhead to be operatively disengaged from the arm mount assembly.

In some embodiments, the tab is configured to pivotally move in an upward and downward trajectory and is situated directly adjacent to and underneath the cavity. Additionally, a spring can be configured to compress and decompress as a function of the button and tab. Specifically, when the button is pressed, the spring is decompressed and the tab extends upwardly so as to protrude into the cavity area and secure the connection point (e.g., the ball) within the cavity. Conversely, when the button is depressed, the spring compresses and the tab pivots downwardly. In some embodiments, the tab is positioned and configured so that when it pivots downwardly, it is no longer protruding into the cavity so as to provide an engagement point which allows the connection point to release from within the cavity. Various spring-loaded button and tab constructions for providing these capabilities can be selected by those skilled in the art.

Advantageously, the showerhead assembly provides for an arm mount assembly which allows for secure retention of the handheld showerhead onto a coupling structure of the arm mount.

Also advantageously, the arm mount assembly allows the bather to controllably adjust the positioning of the handheld showerhead so as to provide a wide range of movement, rotation, panning, swiveling, and tilting. As such, the user can divert the water stream in a desired location within the shower environment.

Also advantageously, the arm mount assembly allows the bather to couple the arm mount assembly with the handheld showerhead at various positions so as to allow the user to orient the handheld showerhead in different directions and spray water at different trajectories in a shower stall. For example, in some exemplar embodiments, the arm mount assembly can connect to the rear side of the handheld showerhead, the proximal end of the handheld showerhead, and/or the adapter which is operatively coupled with the handheld showerhead by the adapter.

Other features and advantages of the present invention will be appreciated by those skilled in the art upon reading the detailed description which follows with reference to the drawings.

BRIEF DESCRIPTION OF THE DRAWINGS

FIGS. 1-7 are side perspective views depicting various different positions of an exemplar embodiment of a handheld showerhead assembly on an arm mount assembly, wherein the arm mount assembly is coupled with the pipe of a water source through a ball and socket attachment;

FIGS. 10-12 are side perspective views depicting various different positions of an exemplar embodiment of a handheld showerhead assembly coupled with an arm mount assembly by way of the adapter depicted in FIG. 8;

FIGS. 15-17 are side perspective views depicting various different positions of an exemplar embodiment of an arm mount assembly coupled with a handheld showerhead by a cavity disposed on its rear side, wherein the arm mount assembly is coupled with the handheld showerhead by a magnet attachment mechanism;

FIGS. 24-29 are side perspective views depicting various different positions of an exemplar embodiment of a handheld showerhead assembly coupled with the arm mount assembly, wherein the handheld showerhead assembly is coupled with the arm mount assembly by way of the adapter depicted in FIGS. 22-23;

FIGS. 32-34 are side perspective views depicting various different positions of an exemplar embodiment of a handheld showerhead assembly coupled with the arm mount assembly, wherein the handheld showerhead assembly is coupled with the arm mount assembly by way of the adapter depicted in FIGS. 30-31;

FIGS. 35-37 are side perspective views depicting various different positions of an exemplar embodiment of a handheld showerhead assembly coupled with the arm mount assembly, wherein the arm mount assembly is coupled with the handheld showerhead by its rear side by a hook and loop attachment mechanism.

DETAILED DESCRIPTION OF THE INVENTION

Figure 8:
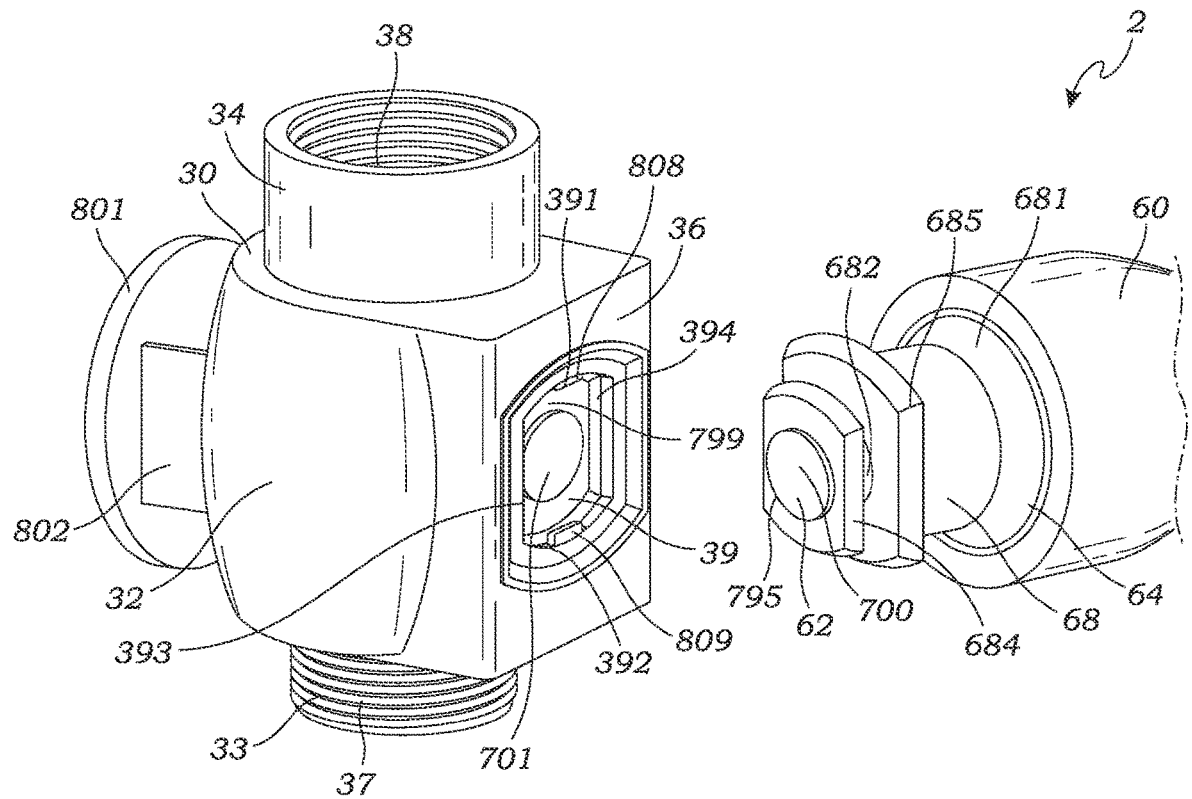
FIG. 8 is a left partially exploded view depicting an exemplar embodiment of an adapter and a coupling structure of an arm mount assembly.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to all FIGS. 1-39, the showerhead assembly 1 includes an arm mount assembly 2 for releasably and/or extendably holding a handheld showerhead 53. Specifically, the arm mount assembly 2 includes one or more shoulder portions 11 and a dynamic or movable arm portion 12. More specifically, and as best depicted in FIGS. 1 and 3, the one or more shoulder portions 11 include a first shoulder 11a and a second shoulder 11b. Even more specifically, and in some embodiments, the first shoulder 11a and the second shoulder 11b are fixed. In some embodiments, the movable arm portion 12 is positioned between the first shoulder 11a and the second shoulder 11b, and is operatively coupled therewith by a first attachment point 16 and a second attachment point 14. Specifically, in some embodiments, the first attachment point 16 comprises a first joint 13, and the second attachment point 14 comprises a second joint 15, wherein the first joint 13 and the second joint 15 secure the movable arm portion 12 and allow the arm portion 12 to move relative to the first joint 13 and/or the second joint 15 with a wide range of adjustability, such as panning, swiveling, tilting, and/or rotation (e.g., an upward or downward angled movement, or frontward and backward angled movement). In this regard, the arm mount assembly 2 is capable of providing bathers with a wide range of height, depth, tilt, and swivel options for front-to-back and up-to-down movements that allow the handheld showerhead 53 to spray water in different directions and heights throughout a shower stall, as desired by the bather. For example, the user can orient the handheld showerhead 53 in a straight and forward position, as shown in FIG. 1. Further, the user can orient the handheld showerhead 53 in an upright and backward position, as shown in FIG. 2, or a downward and backward position, as depicted in FIG. 3. Further, due to the arm portion's 12 connection with the first joint 13 and second joint 15, and as shown in, e.g., FIGS. 2-3, the user can fold the handheld showerhead 53 towards the end of the traditional shower stall pipe while keeping the handheld showerhead in an upright position. In this regard, the arm assembly 2 has a double hinged connection, wherein the arm portion can move relative to two distinct points, such as, the first attachment point 16 and the second attachment point 14. Those of skill in the art will appreciate that various other configurations and positions of the handheld showerhead 53 relative to the arm mount assembly 2 can be utilized without departing from the scope of the disclosure.

In some embodiments, and with reference to FIGS. 1-39, the arm mount assembly 2 comprises a connection end 64, a second shoulder outlet 65, and a coupler 63, as will be described in further detail below. In some preferred embodiments, and as best depicted in FIGS. 1 and 3, the connection end 64 of the arm mount assembly 2 is disposed on the first shoulder 11a, and the second shoulder outlet 65 and the coupler 63 are disposed on the second shoulder 11b. Those of skill in the art will recognize that various other configurations of the connection end 64, second shoulder outlet 65, and coupler 63 can be utilized without departing from the scope of the present disclosure.

As best shown in FIGS. 1-3, The handheld showerhead 53 portion of the showerhead assembly 1 has unique features but like traditional constructions includes a hollow handle 49 having a proximal end 51 which is operatively coupled with a flexible hose 41 having a first end 25 and a second end 27, and a distal end which includes a showerhead 53. The handle 49 includes a longitudinal axis, and preferably the showerhead 53 affixes to the distal end of the handle 49 at an angle, such as 45° to 90°, relative to the handle's 49 longitudinal axis. The showerhead assembly's handheld showerhead 53 has a front face 55 through which a plurality of nozzles 57 project.

As understood by those skilled in the art, and as best shown in FIGS. 1-3, water is capable of flowing through a central channel (not shown) within the center of the handle 49 which connects to the showerhead's nozzles 57 which are constructed to spray water. Specifically, the coupler 63 of the arm mount assembly 2 is configured to connect to a pipe of a water source. More specifically, the coupler 63 includes female threads for connecting to male threads found at the end of a traditional shower stall pipe. Even more specifically, the second shoulder outlet 65 of the arm mount assembly 2 is configured to connect to the flexible hose 41 of the handheld showerhead 53. And even more specifically, the second shoulder outlet 65 is configured to connect with the second end 27 of the flexible hose 41. Preferably, the second shoulder outlet 65 male threads 67 for connecting to the female threads found at the second end 27 of the flexible hose 41. Further, in preferred embodiments, the second shoulder is hollow and comprises a central conduit (not shown) which extends from the coupler 63 to the second shoulder outlet 65. As such, water is transported from a primary conduit (not shown) in the coupler 63 and through the central conduit (not shown) of the second shoulder 11b so as to be transported to the flexible hose 41 by way of the second shoulder outlet 65. In this regard, water is able to be transported from the pipe of the water source through the flexible hose 41 so as to ultimately reach the handheld showerhead 53 for expellation therefrom. In some embodiments, and as best depicted in FIGS. 1-7, a proximal portion of the coupler 63 is connected to the pipe of a water source by a ball and socket attachment. In this regard, the coupler 63 is able to move, rotate, or swivel about a central axis so as to allow the user to manipulate the positioning of the arm mount assembly 2, thereby allowing the user to further manipulate the angle of the handheld showerhead 53 and the water expelling therefrom. For example, the user can orient the handheld showerhead 53 at various upright angles (FIGS. 4 and 7) or various downward angles (FIGS. 5 and 6) or tilts by altering the positioning of the arm mount assembly 2 relative to the ball and socket attachment realized by the coupler 63 and the pipe, and/or the positioning of the movable arm portion 12 relative to the first joint 13 and second joint 15. In this regard, the arm mount assembly 2 is movable relative to three different points. For example, the arm mount assembly 2 is movable relative to the ball and socket attachment realized by the coupler 63 and the pipe, the first joint 13, and/or the second joint 15.

According to some embodiments, and as best depicted in FIGS. 8-9, 13-14, and 30-31, the connection end 64 comprises a coupling structure 68 for removably and operatively affixing with the handheld showerhead 53 (not depicted in FIGS. 8-9, 13-14, and 30-31) by way of a showerhead engagement surface 799. In some preferred embodiments, a proximal portion 681 of the coupling structure 68 is connected to the connection end 64 by a ball joint attachment. In this regard, the coupling structure 68 is able to rotate or swivel about a central axis of the connection end 64. Preferably, the coupling structure 68 comprises a connection point 62 which operatively engages with the showerhead engagement surface 799 of the handheld showerhead 53. As such, when the arm mount assembly 2 is operatively connected to the handheld showerhead 53 in this manner, the user can manipulate the angle of the handheld showerhead 53 due to the ball joint attachment realized by the coupling structure 68 and connection end 64. For example, the coupling structure 68 can swivel from side to side, so as to change the positioning of the handheld showerhead 53 operatively coupled to the arm mount assembly 2 attached thereto, thereby altering the trajectory of the water spraying from the handheld showerhead's nozzles 57. Those of skill in the art will recognize that other coupling mechanisms can be utilized to connect the coupling structure 68 to the connection end 64 of the arm mount assembly 2 without departing from the scope of the disclosure.

According to an aspect of the embodiments, an attachment means is utilized for operatively coupling the arm mount 2 to the handheld showerhead 53. More specifically, in some embodiments, the handheld showerhead 53 comprises an attachment means comprising the showerhead engagement surface 799 for affixing to the arm mount engagement surface 795. In like manner, the arm mount assembly 2 includes a complementary attachment means comprising the arm mount engagement surface 795 for attaching to the handheld showerhead 53.

In some embodiments, and with reference to FIGS. 13-21, and 35-37, the handheld showerhead 53 comprises a cavity 39 which includes the showerhead engagement surface 799 (best shown in FIGS. 13 and 18) for releasably engaging with the coupling structure 68. Specifically, the cavity 39 is configured to receive the connection point 62 of the coupling structure 68 and thereby engage with the arm mount 2 so as to movably, extendably, foldably, and/or releasably dock the attached handheld showerhead 53 by the connection point 62.

Figure 13:
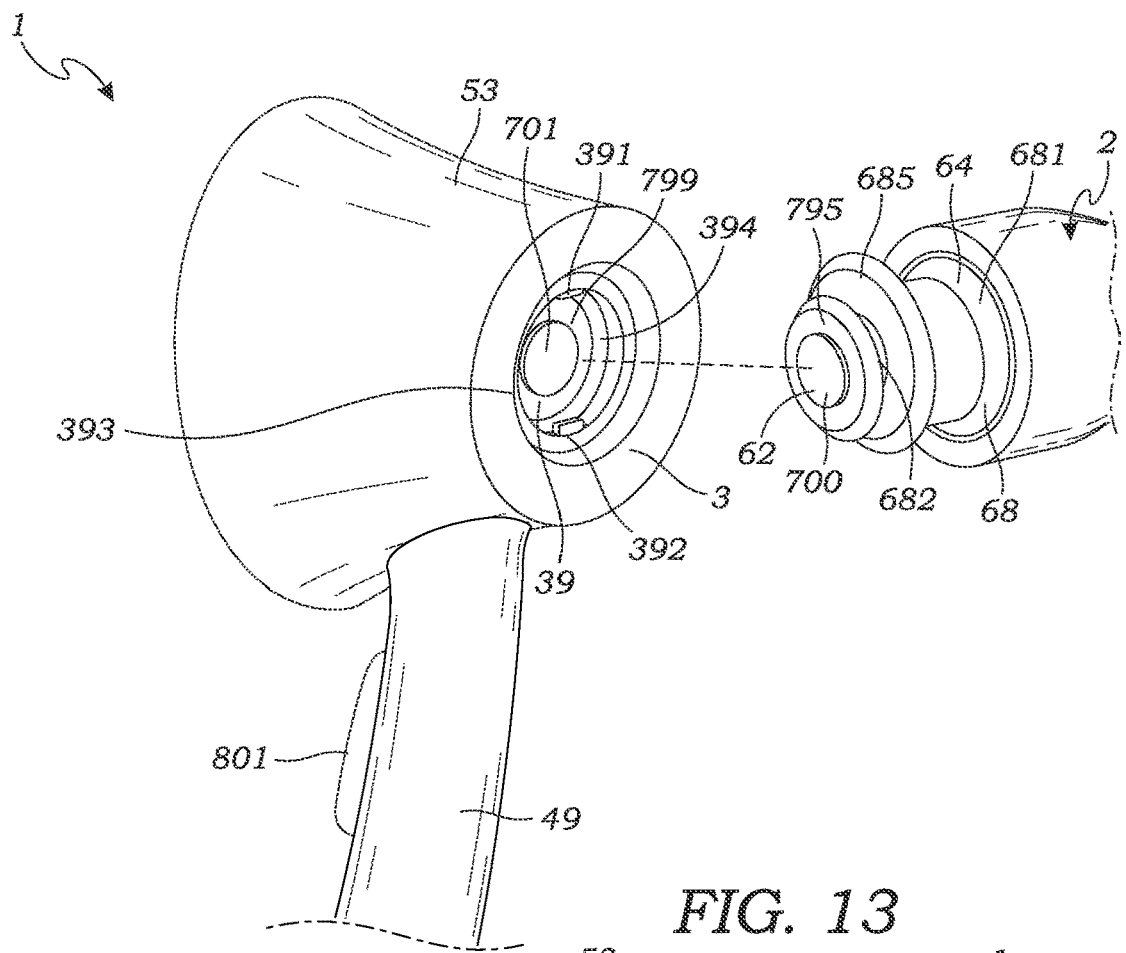
FIG. 13 is a partially exploded view of an exemplar embodiment of a handheld showerhead and an arm mount assembly, wherein the showerhead assembly utilizes a magnet attachment mechanism.
Figure 14:
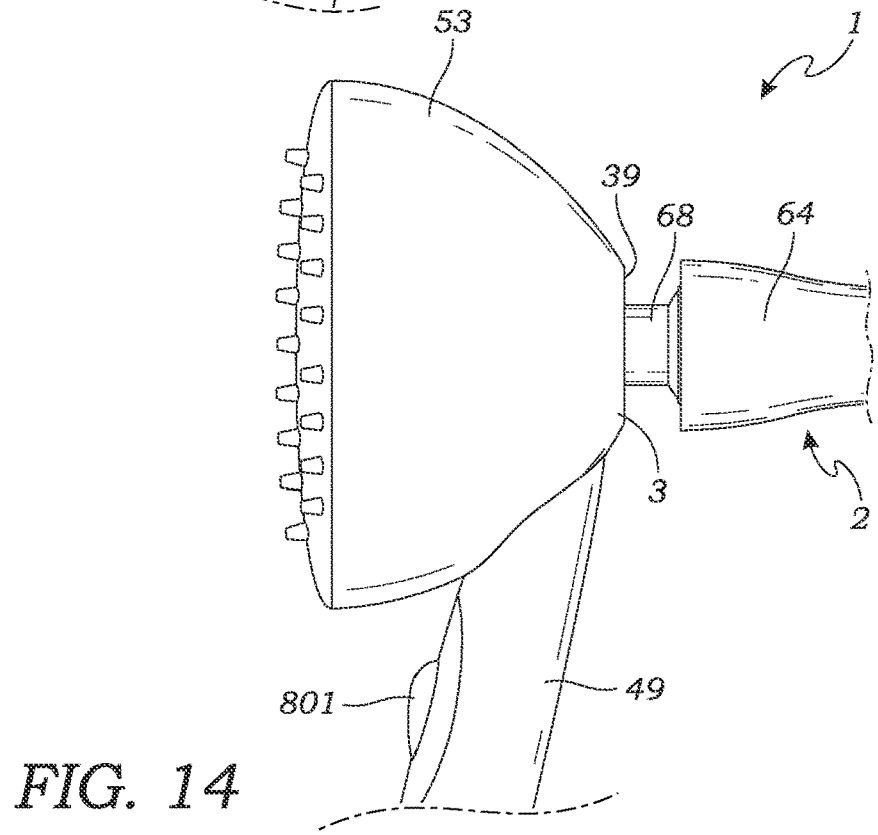
FIG. 14 is a close-up side perspective view of the handheld showerhead and arm mount assembly depicted in FIG. 13, illustrating the handheld showerhead connected with the arm mount assembly.
Figure 18:
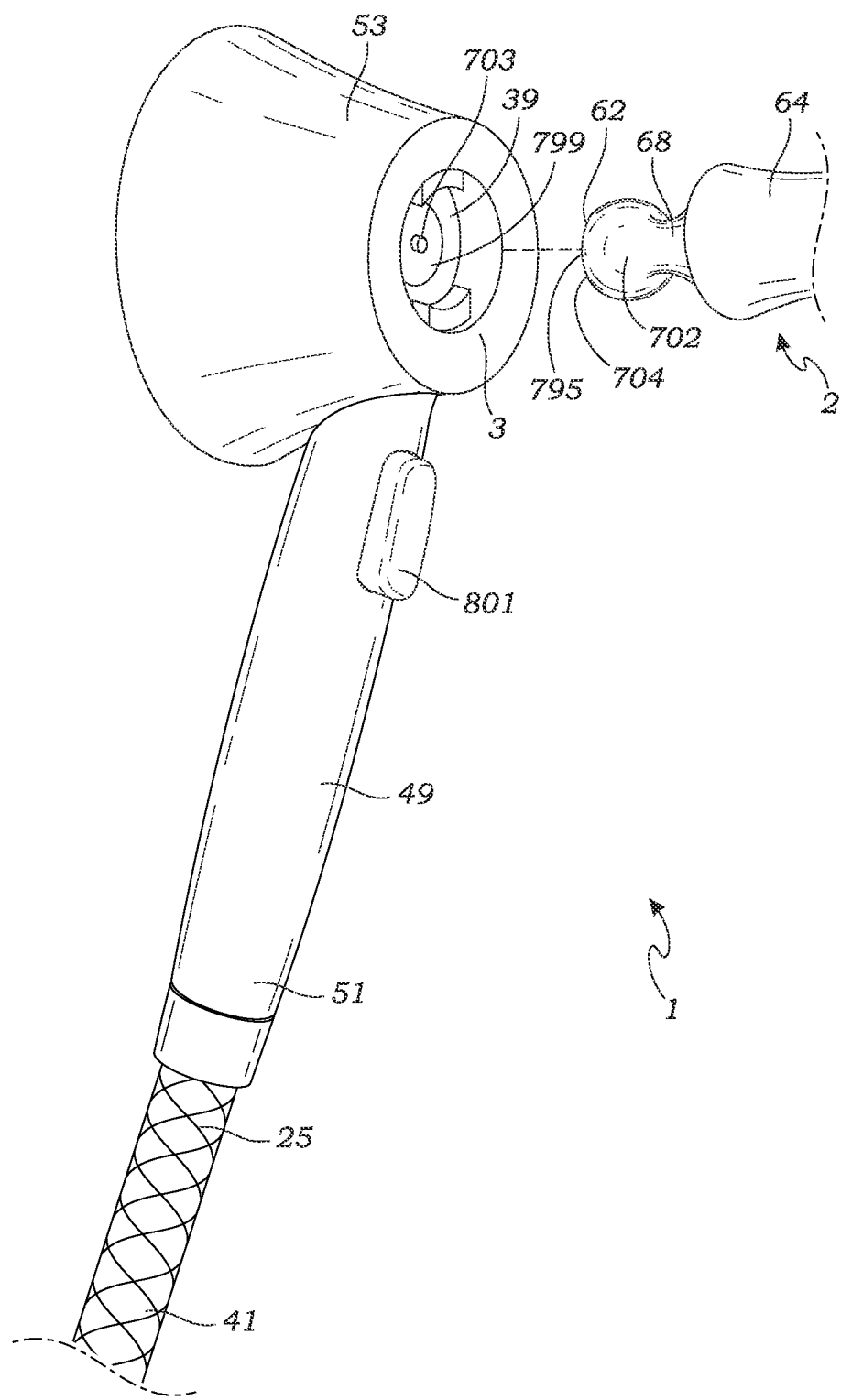
FIG. 18 is a partially exploded view of an exemplar embodiment of a handheld showerhead and an arm mount assembly, illustrating the coupling structure comprising a ball.
Figure 19:
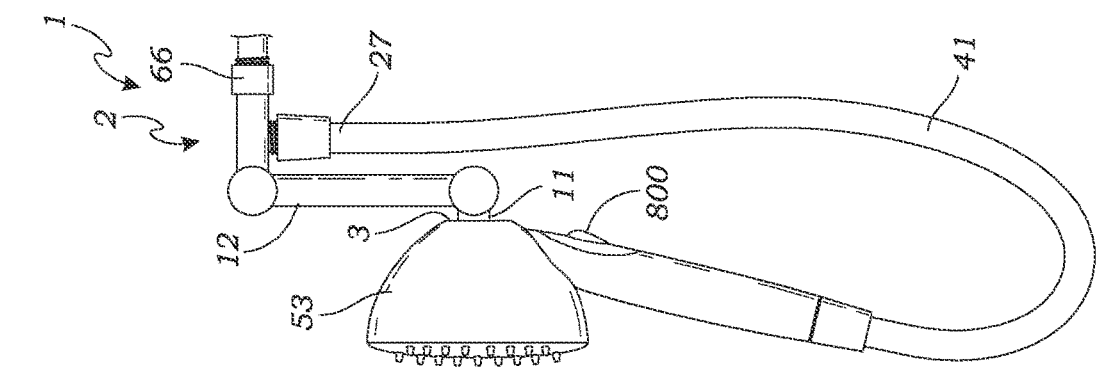
FIGS. 19-21 are side perspective views depicting various different positions of an exemplar embodiment of a handheld showerhead assembly coupled with the arm mount assembly depicted in in FIG. 18.
Figure 20:
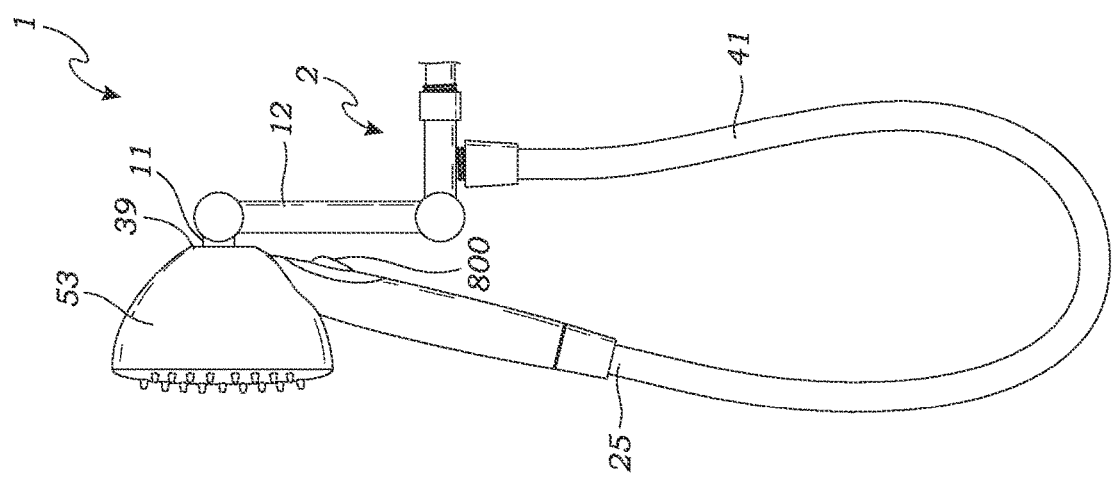
Figure 21:
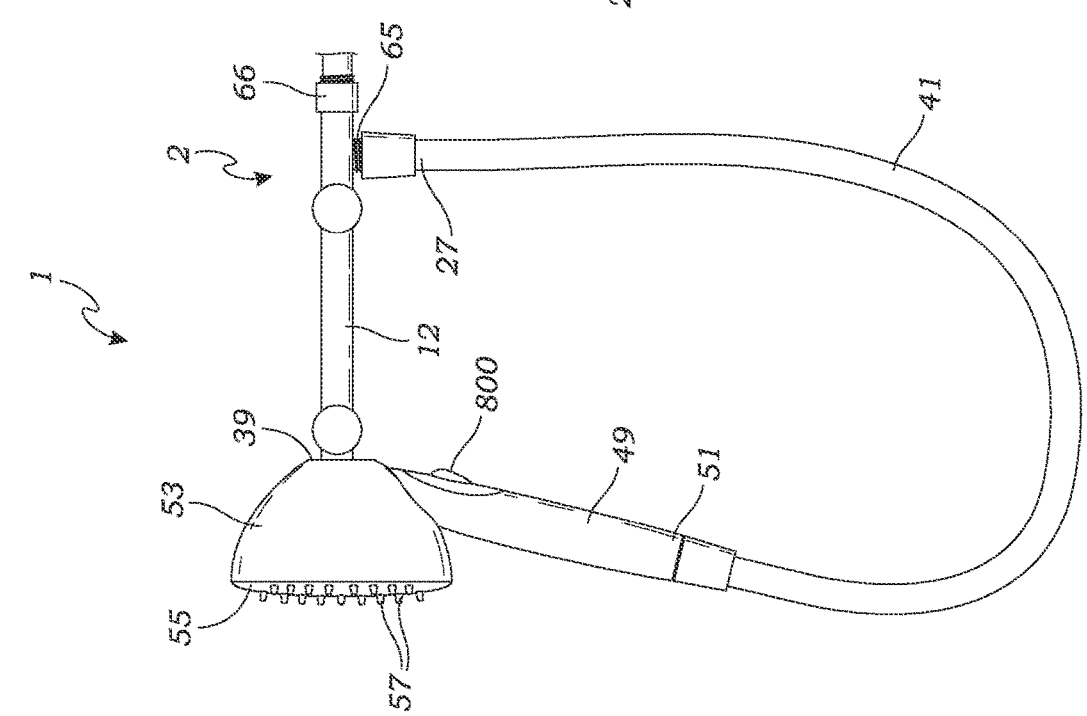

Specifically, in some embodiments, the cavity 39 and/or the showerhead engagement surface 799 are disposed on a rear side 3 of the handheld showerhead 53, as best depicted in FIGS. 13 and 18. In some embodiments, the cavity 39 and/or the showerhead engagement surface 799 are disposed on the handle 49 or a proximal end 51 of the handheld showerhead 53, as depicted in FIGS. 1-7, and 38-39. Specifically, and with reference to FIGS. 1-7, and 38-39, a portion of the proximal end 51 can define the showerhead engagement surface 799. Further, in some embodiments, and as best depicted in FIGS. 8-9, 22-23, and 30-31, the cavity 39 and/or the showerhead engagement surface 799 are disposed on an adapter 30 which is operatively coupled with the handheld showerhead 53 (not depicted in FIGS. 9, 22-23, and 30-31). In this manner, the arm mount assembly is operatively and movably connected with the handheld showerhead 53. Specifically, in some exemplar embodiments, the proximal end 51 of the handheld showerhead 53 is configured to releasably affix with the adapter 30 comprising the showerhead engagement surface 799. More specifically, when the adapter 30 is connected to the handheld showerhead 53 and is attached with the coupling structure 68 by the connection point 62 affixing to the showerhead engagement surface 799, the arm mount assembly 2 is operatively coupled with the handheld showerhead 53.

Specifically, in some embodiments, the adapter 30 is coupled with and in fluid communication with the flexible hose 41, which is coupled with and in fluid communication with the second shoulder outlet 65 that connects to the coupler 64 in fluid communication with the water source. As such, in some embodiments, water travels from the hose 41 to a passageway 31 in the adapter 30 so as to pass through the central channel (not shown) within the handle 49 and, ultimately, expel from the nozzles 57 of the handheld showerhead 53.

In preferred embodiments, and with reference to FIGS. 8-9, 22-23, and 30-31, the adapter 30 can comprise a housing 32 which includes an inlet 33, an outlet 34, a front end 35, and a back end 36. In some embodiments, the housing 32 is generally cylindrical in shape. Various other adapter 30 shapes can be determined by those skilled in the art without departing from the scope of the disclosure. Specifically, the adapter's inlet 33 is configured to connect to a water supply. Preferably, the inlet 33 includes female threads 37 for connecting to the male threads found at the first end 25 of the flexible hose 41. Further, the adapter's outlet 34 is configured to connect to the proximal end 51 of the handle 49. Preferably, the outlet 34 includes male threads 38 for threadably affixing to female threads found at the proximal end 51 of the handle 49. In preferred embodiments, the housing 32 further comprises the passageway 31 which extends between the inlet 33 and the outlet 34. In this regard, the inlet 33 is in fluid communication with the outlet 34. Specifically, water is transported from the flexible hose 41 into the adapter 30 by way of the inlet 33. More specifically, water is transported through the passageway 31 and exits the outlet 34 so as to travel through the handheld showerhead 53 for expellation therefrom.

In some embodiments, though not illustrated, the handheld showerhead 53 can comprise both the rear side 3 which includes a first showerhead engagement surface 799a for releasably engaging with the coupling structure 68, and the adapter 30 comprising a second showerhead engagement surface 799b configured to releasably engage with the coupling structure 68. As such, the user can select the position at which the arm mount 2 connects with the handheld showerhead 53 so as to alter the trajectory of the water spraying from the handheld showerhead's nozzles 57.

In preferred embodiments, the cavity 39 is a substantially spherical cavity. A "substantially spherical cavity" is defined as having a substantial portion of its surface as having a spherical or curved shape. However, "substantially spherical cavity" is intended to be interpreted broadly such that the entire cavity 39 need not have concave surface. For example, the substantially spherical cavity 39 can include a portion of the surface that is planar such as to form a frusto-spherical shape. Preferably, and as best depicted in FIGS. 8 and 13, the cavity 39 is shaped such that it comprises a rounded or curved top edge 391 and a curved bottom edge 392, wherein the curved top edge 391 and the curved bottom edge 392 are positioned opposite of one another. More preferably, the cavity 39 is shaped such that it comprises a first flat edge 393 and a second flat edge 394, wherein the first flat edge 393 and the second flat edge 394 are positioned opposite of one another. Even more preferably, each flat edge 393, 394 is adjacent to each curved edge 391, 392, and each curved edge 391, 392 is adjacent to each flat edge 393, 394.

Preferably, in some embodiments, and as best shown in FIGS. 8 and 13, the coupling structure 68 has a distal portion 682 comprising the connection point 62 axially extending therefrom. Further, in some embodiments, the arm mount engagement surface 795, which defines the connection point 62, is sized and configured to correspond to the shape of the cavity 39, which comprises the showerhead engagement surface 799. In this regard, the arm mount engagement surface 795 can include flat sides 684 which are complementary to the flat edges 393, 394 of the cavity 39. In some embodiments, due to the flat geometry of the arm mount engagement surface 795 and cavity 39, the handheld showerhead 53 is able to be kept in an upright position upon engagement of the showerhead engagement surface 799 with the cavity 39. In this regard, the coupling between the handheld showerhead 53 and arm mount assembly 2 is strengthened. Further, the handheld showerhead 53 is prevented from inadvertent rotation. Due to the ball and socket attachment of the coupling structure 68 to the connection end 64, however, the user can still intentionally rotate and move the handheld showerhead 53 to a desired position. In this regard, the ball and socket attachment of the coupling structure 68 in conjunction with the movable arm portion 12 provides the user with further mobility and rotation of the showerhead assembly 1.

In some preferred embodiments, and as best shown in FIGS. 8 and 13, the distal portion 682 of the coupling structure 68 further comprises an alignment surface 685. In some embodiments, the alignment surface 685 axially extends from the distal portion 682. Preferably, the alignment surface 685 has a larger surface area than the arm mount engagement surface 683. More preferably, the alignment surface 685 can be the same shape as the arm mount engagement surface 795. Even more preferably, the alignment surface 685 is sized and configured to be complementary to a portion of the cavity 39. In this regard, the alignment surface 685 functions to further stabilize and secure the connection realized between the coupling structure 68 and handheld showerhead. In some embodiments, an outer perimeter of the alignment surface 685 corresponds to a largest perimeter of the cavity 39 so as to further secure the connection realized between the handheld showerhead 53 and the coupling structure 68.

Figure 9:
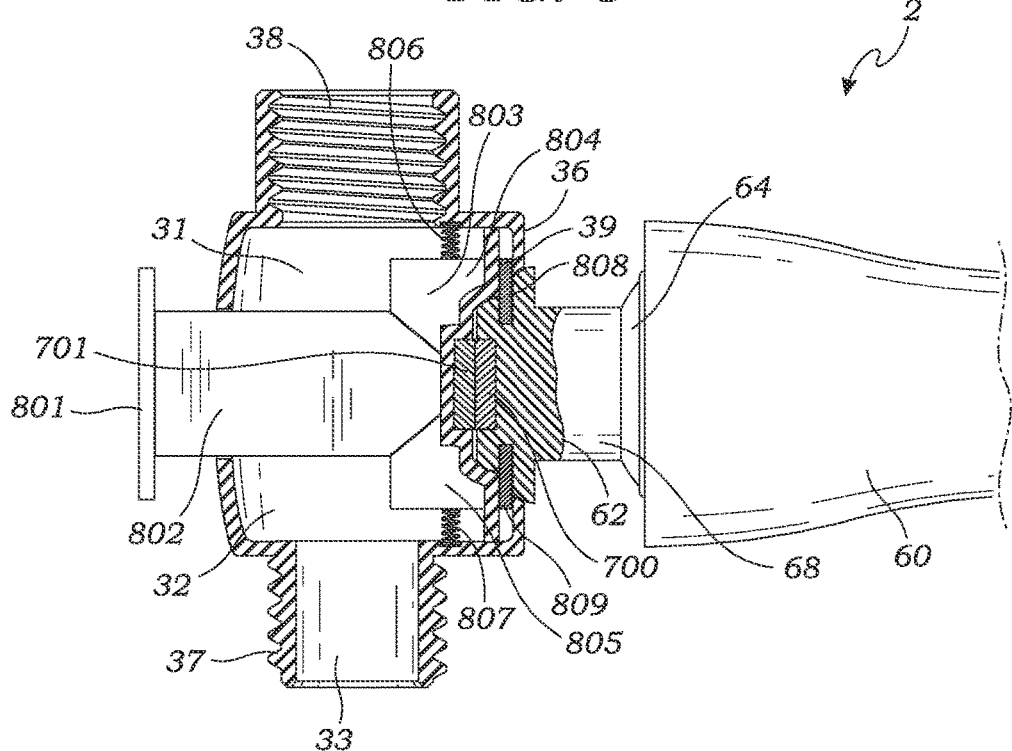
FIG. 9 is a left side cutaway view of the adapter and coupling structure of the arm mount assembly depicted in FIG. 8, illustrating the adapter connected to the coupling structure.

In some preferred embodiments, and with reference to FIGS. 8-13, the arm mount engagement surface 795 which defines the connection point 62, includes an attachment mechanism, such as a magnetically attractable material or connector magnet 700. In these embodiments, and as best shown in FIGS. 8-9, and 13, the cavity 39 which comprises the showerhead engagement surface 799 includes a corresponding attachment mechanism, such as a magnetically attractable material complementary to the connector magnet or a reciprocal magnet 701. Preferably, the connector magnet 700 and the reciprocal magnet 701 each produce a magnetic field and are attracted to one another. In this regard, the handheld showerhead 53 is coupled with the coupling structure 68 by attraction of the connector magnet 700 to the reciprocal magnet 701. In some embodiments, the connector magnet 700 is a magnetic disk 700 disposed on or protruding from the arm mount engagement surface 795. In some embodiments, a complementary reciprocal magnet 701 (e.g., a magnetic disk 701) of the handheld showerhead 53, is disposed within the cavity 39 of the handheld showerhead 53. In some exemplar embodiments, the complementary reciprocal magnet 701 can be housed within the cavity 39 and protrude from a planar showerhead engagement surface 799 therefrom.

Specifically, in some embodiments, and with particular reference to FIGS. 8-12, the cavity 39 comprising the reciprocal magnet 701 is disposed on the adapter 30, which is configured to operatively couple with the arm mount assembly 2 by way of the coupling structure 68. In some embodiments, and with particular reference to FIGS. 13-17, the cavity 39 comprising the reciprocal magnet 701 is disposed on the rear side 3 of the handheld showerhead 53, which is configured to couple with the arm mount assembly 2 by way of the coupling structure 68. In this regard, the arm mount assembly 2 can movably and releasably connect with the handheld showerhead 53 at various positions.

In other preferred embodiments, and with reference to FIGS. 15-29, the coupling structure 68 defines a curved area by which a ball 702 extends therefrom (best shown in FIG. 18). More specifically, in some embodiments, the rear side 3 of the handheld showerhead 53 comprises the cavity 39 with the showerhead engagement surface 799 for releasably engaging with the coupling structure 68 having a ball 702. In other embodiments, and with particular reference to FIGS. 22-29, the adapter 30 coupled with the handheld showerhead 53 comprises the cavity 39 with the showerhead engagement surface 799 for releasably engaging with the coupling structure 68 having a ball 702. In some embodiments, and as best depicted in FIG. 18, the ball 702 comprises an arm mount engagement surface 795 and defines the connection point 62 and attachment mechanism. Specifically, the ball 702 is sized and configured to releasably engage with the handheld showerhead's cavity 39. More specifically, in these embodiments, the cavity 39 defines a space correspondingly configured for receipt of the ball 702. Upon engagement of the cavity 39 with the ball 702, the handheld showerhead 53 is thereby removably and rotatably engaged with the arm mount assembly 2.

Figure 22:
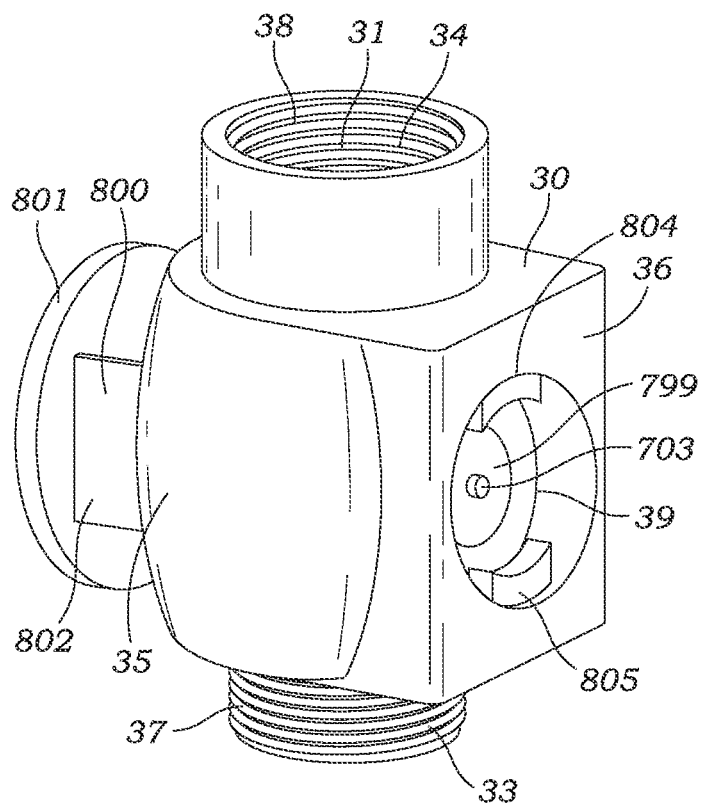
FIG. 22 is a left perspective view of an exemplar embodiment of an adapter that can be utilized to couple a handheld showerhead with an arm mount assembly.
Figure 23:
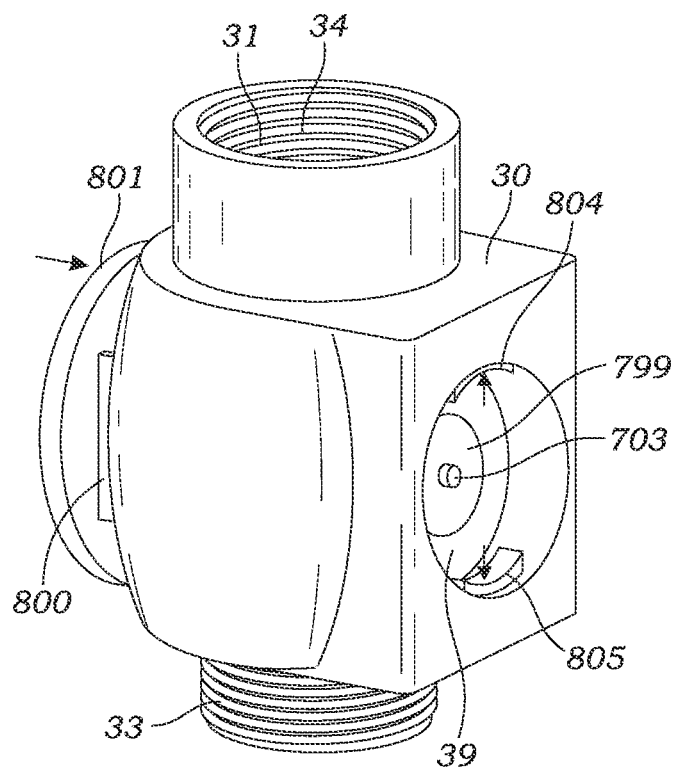
FIG. 23 is a perspective view of the adapter illustrated in FIG. 22, depicting the button being pressed, and the upper clasp and lower clasp moving in the housing so as to no longer protrude from the cavity.

Preferably, and as best illustrated in FIGS. 18, and 22-23, the cavity 39 can include a tension pin 703 which extends axially from the cavity's planar showerhead engagement surface 799. Additionally, the tension pin 703 is sized and configured to engage with corresponding structures that reside on the ball 702 wherein it provides tension therebetween to help maintain the arm mount assembly 2 coupled with the handheld showerhead 53 in a desired position by way of securely connecting the handheld showerhead 53 with the coupling structure 68. Though not shown, in some embodiments, the ball 702 has a distal end 704 being planar and comprising a preliminary alignment chamber and a second axially aligned smaller locking chamber. Preferably, the preliminary alignment chamber and locking chamber are both spherical in shape. Though not illustrated, the locking chamber can be sized and positioned to engage with the tension pin 703, wherein the engagement of the tension pin 703 with the locking chamber prevents over-rotation of the ball 702, or inadvertent release of the handheld showerhead 53 from the coupling structure 68. Moreover, the preliminary alignment chamber can be sized and positioned for receipt of the tension pin 703. The engagement of the tension pin 703 with the preliminary alignment chamber further stabilizes the connection realized between the handheld showerhead 53 and the coupling structure 68, and secures the ball 702 in place so as to prevent it from popping out of the cavity 39.

Figure 30:
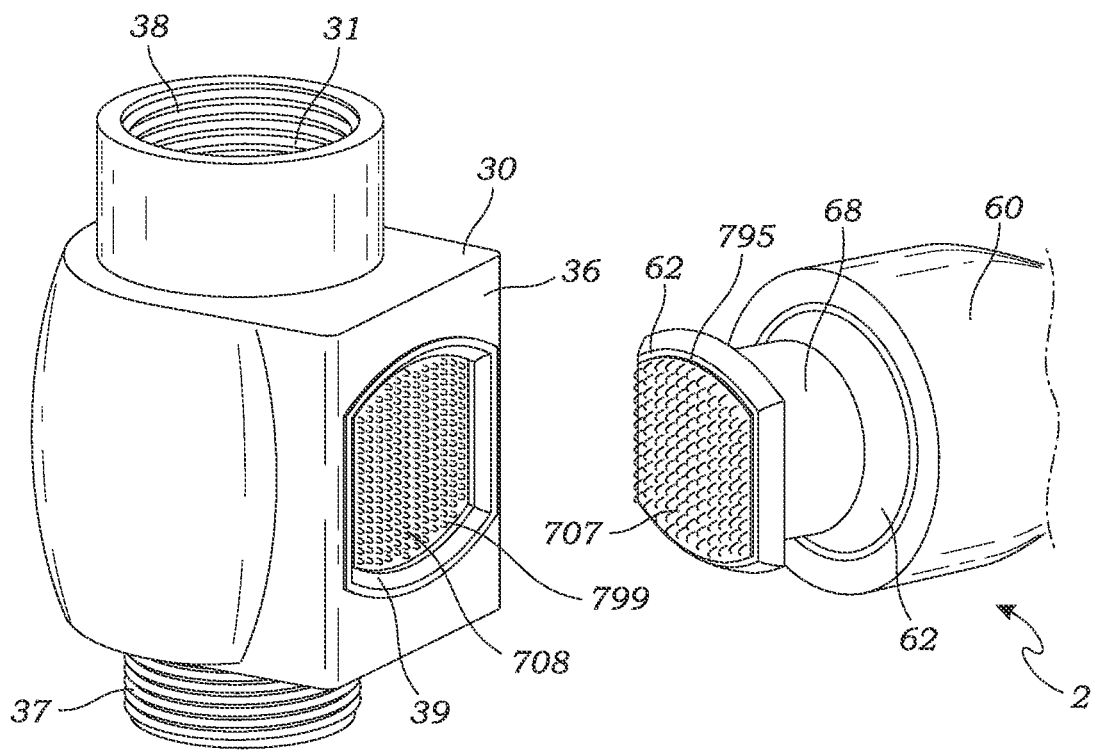
FIG. 30 is a partially exploded view of an exemplar embodiment of an adapter for a handheld showerhead and an arm mount assembly, wherein the showerhead assembly utilizes a hook and loop attachment mechanism.
Figure 31:
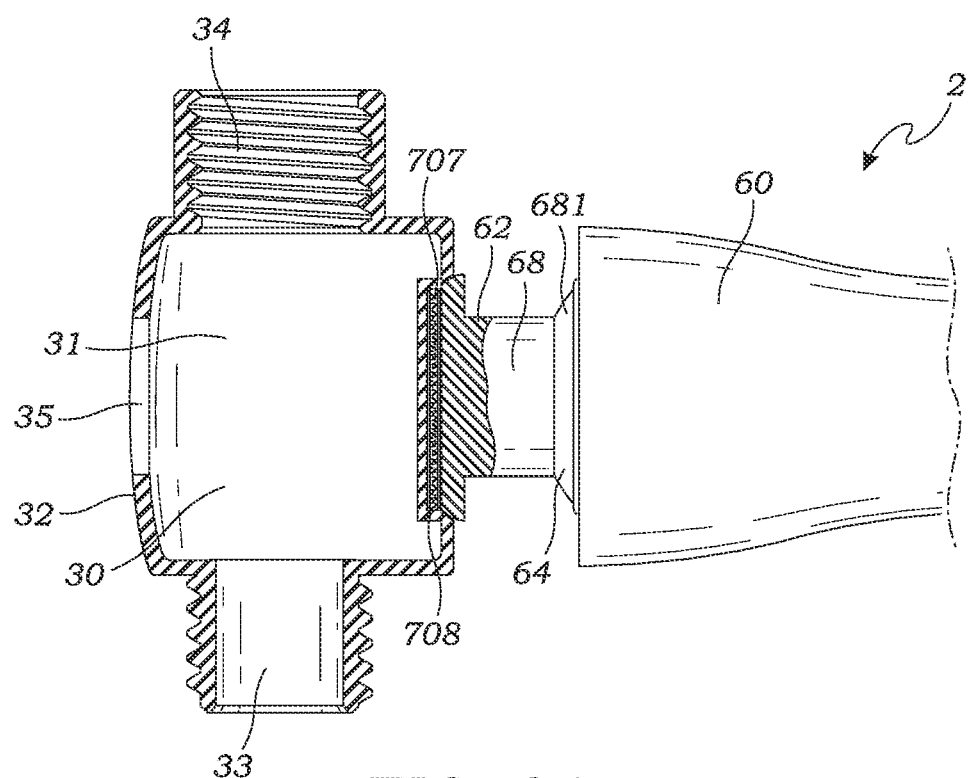
FIG. 31 is a close-up side perspective view of the handheld showerhead and arm mount assembly depicted in FIG. 30, illustrating the handheld showerhead connected with the arm mount assembly.

Those of skill in the art will recognize that other fastener or attachment mechanisms can be utilized to connect the handheld showerhead 53 with the coupling structure 68 of the arm mount assembly 2 without departing form the scope of the disclosure. For example, in some embodiments, the coupling structure 68 can be connected to the handheld showerhead 53 by way of a hook and loop attachment mechanism. In these embodiments, and with reference to FIGS. 30-37, the connection point 62 of the coupling structure 68 can include one or more hook portions 707 and the cavity 39 can comprise one or more loop portions 708, or vice versa. Specifically, in these embodiments, the arm mount engagement surface 795 and the showerhead engagement surface 799 can each be covered with a particular attachment mechanism. For example, the hook portions 707 can be disposed on a portion or entirety of the arm mount engagement surface 795 and the loop portions 708 can be disposed on a portion or entirety of the showerhead engagement surface 799, or vice versa. In some embodiments, the coupling structure 68 can be connected to the handheld showerhead 53 by way of an adhesive, such as Velcro. In some embodiments, and as shown in FIGS. 35-37, the cavity 39 comprising the hook portion 707 or loop portion 708 is disposed along the rear side 3 of the handheld showerhead 53 so as to couple with the arm mount assembly 2 therefrom. In other embodiments, and as best depicted in FIGS. 30-31, the cavity 39 comprising the hook portion 707 or loop portion 708 is disposed on the adapter 30 coupled with the handheld showerhead 53 so as to couple with the arm mount assembly 2 therefrom.

Figure 39:
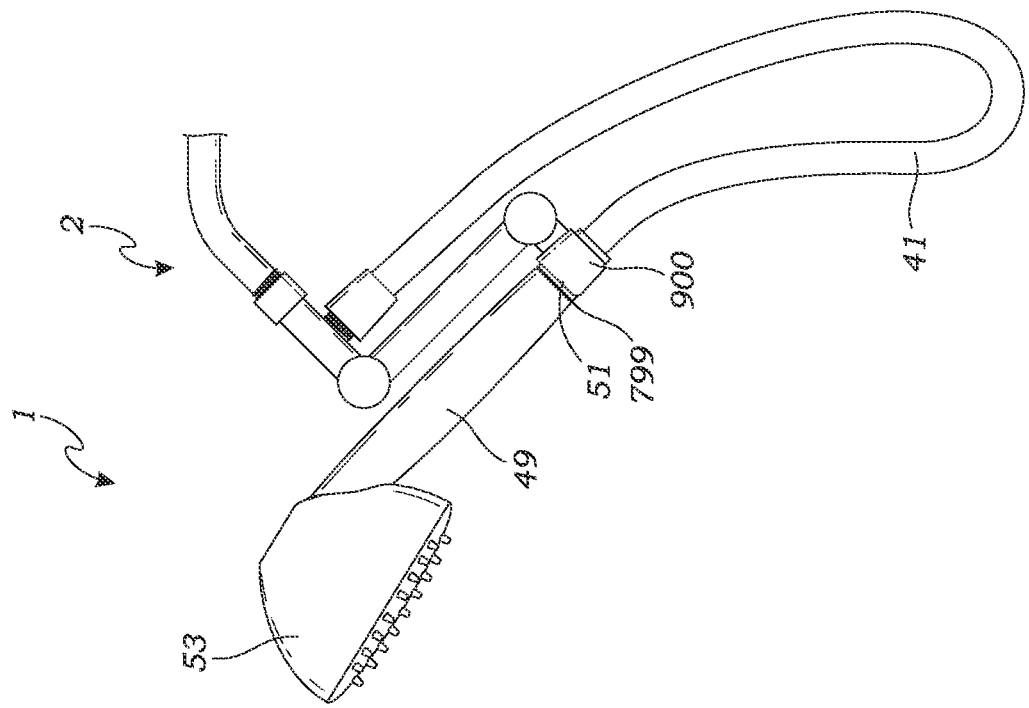
FIGS. 38-39 are side perspective views depicting various different positions of an exemplar embodiment of a handheld showerhead assembly coupled with the arm mount assembly, wherein the handheld showerhead assembly is coupled with the arm mount assembly by way of a collar securely holding a portion of the handheld showerhead's handle.
Figure 38:
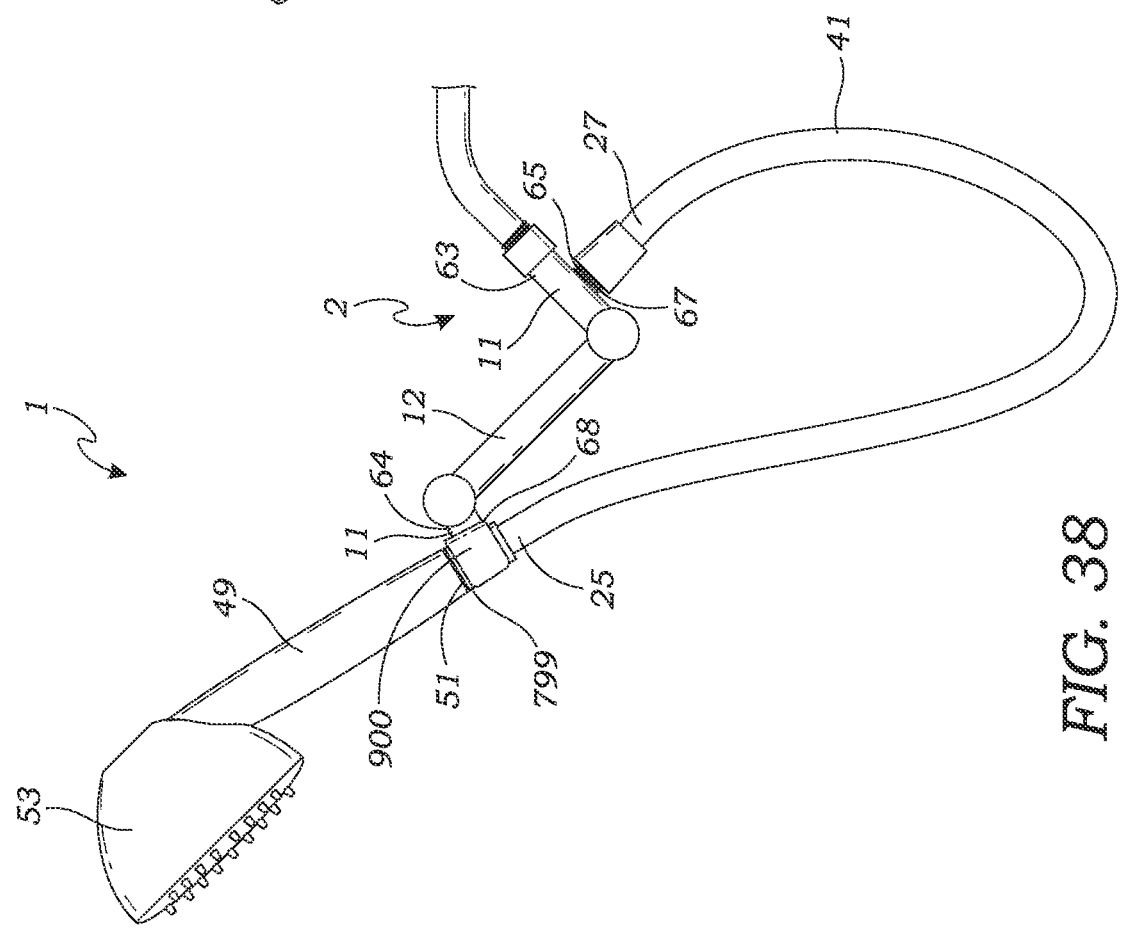

In some embodiments, and as depicted in FIGS. 1-7, and 38-39, the coupling structure 68 of the arm mount assembly 2 is configured to removably attach to the proximal end 51 or handle 49 of the handheld showerhead 53. For example, as best depicted in FIGS. 38-39, the coupling structure 68 comprises a collar 900 sized and configured to securely hold a portion of the handle 49. Specifically, in some embodiments, a portion of the handle 49 includes the showerhead engagement surface and the collar 800 is configured to hold said portion. Further, the collar includes a slot (not shown) for passage of the hose 41. Those of skill in the art will appreciate that various fastening mechanisms can be utilized to couple the arm mount assembly 2 to the handheld showerhead 53 by way of the coupling structure affixing with the handle 49.

In preferred embodiments, and with reference to FIGS. 8-29, and 35-37, the showerhead assembly 1 comprises a spring-loaded button and tab mechanism 800 which can further secure and stabilize the connection between the arm mount assembly 2 and handheld showerhead 53. Specifically, the spring-loaded button and tab mechanism 800 can be disposed on the adapter 30 (FIGS. 8-12, 22-26, and 27-29) and/or the handheld showerhead 53 (FIGS. 13-21, and 35-37). More specifically, the handheld showerhead 53 can be operatively secured on or released from the arm mount assembly 2 as a function of the spring-loaded button and tab mechanism 800.

Preferably, in some embodiments, and as best illustrated in FIGS. 8-12, 22-26, and 27-29, the button 801 can extend from the adapter 30. Specifically, the button 801 can protrude from the front end 35 of the adapter 30. Those of skill in the art will appreciate that the button 801 can protrude from various other parts of the adapter 30 without departing from the scope of the disclosure. For example, in some embodiments, the button 801 can extend from the back end 36 of the adapter's housing 32, at a position distal relative to the cavity 39. In other embodiments, and as illustrated in FIGS. 13-21, and 35-37, the button 801 can be disposed on a portion of the handheld showerhead 53. Specifically, and as shown in FIGS. 13-17, and 35-37 the button 801 can protrude from a front side 4 of the handheld showerhead's handle 49. In some embodiments, and as shown in FIGS. 18-21, the button 801 can protrude from the rear side 3 of the handheld showerhead 53 or the handle 49. Those of skill in the art will appreciate that the button 801 can protrude from various other parts of the handheld showerhead without departing from the scope of the disclosure.

In preferred embodiments, the button 801 can be a lever. In some embodiments, the button 801 is coupled with and fits on the tab 802 which is connected to a body 803 of the cavity 39. Specifically, and as best shown in FIG. 9, the body 803 can comprise an upper body portion 804 and a lower body portion 805. Even more specifically, and as best shown in FIGS. 9, the upper body portion 804 and the lower body portion 805 are configured to move between a contracted position (as shown in, e.g., FIG. 22) and an expanded position (as shown in, e.g., FIG. 23) in response to movement of the tab 802. In preferred embodiments, the tab 802 pivotally moves in an inward and outward trajectory relative to the body 803.

Additionally, and as best depicted in FIG. 9, a first spring 806 interfaces with the upper body portion 804 and a second spring 807 interfaces with the lower body portion 805. Preferably, a bottom portion of the first spring 806 is affixed to the upper body portion 804, and an upper portion of the second spring 807 is affixed to the lower body portion 805. More preferably, the bottom portion of the first spring 806 is affixed to an upper surface of the upper body portion 804, and the upper portion of the second spring 807 is affixed to a bottom surface of the lower body portion 805. Even more preferably, as a force is exerted on the button 801 (e.g., an upward force is exerted on the lever 801 or the lever 801 is pressed inwardly), the tab 802 pivots in an inward direction towards the body 803, and the first spring 806 and second spring 807 are configured to compress. In this regard, as the springs 806, 807 compress, the upper body portion 804 can move in an upward direction and the lower body portion 805 can move in a downward direction away from a central axis of the body 803. In other words, the upper body portion 804 and lower body portion 805 move from the contracted position (as shown in, e.g., FIG. 22) to the expanded position (as shown in, e.g., FIG. 23) in response to the button 801 being pressed and the tab 802 moving inwardly.

Contrastingly, if an opposite force is exerted on the button 801 (e.g., if the lever 801 is released, if an outward force is exerted on the lever 801, or if the lever 801 is pulled downwardly), the tab 802 pivots in an outward direction away from the body 802. As such, the first spring 806 and second spring 807 are configured to decompress and the upper body portion 804 moves in a downward direction and lower body portion 805 moves in an upward direction, or in a direction towards the central axis of the body 803, so as to transition from the expanded position to the contracted position.

Further, in preferred embodiments, and still with reference to FIGS. 8-9, an upper clasp 808 extends from the upper body portion 804 and a lower clasp 809 extends from the lower body portion 805. Preferably, the upper clasp 808 and lower clasp 809 are configured such that they a protrude from the cavity 39 when the upper body portion 804 and the lower body portion 805 are in the contracted position. In this regard, the upper clasp 808 and lower clasp 809 extend from the cavity 39 so as to grip the coupling structure 68 by its connection point 62 and secure the connection realized therebetween. In the expanded position, the upper body portion 804 moves in an upward trajectory and the lower body portion 805 moves in a downward trajectory such that the upper clasp 808 and lower clasp 809 are entirely disposed within the housing 32 and no longer protruding from the cavity 39. As such, the handheld showerhead 30 can be released or removed from the coupling structure 68.

In some preferred embodiments, and with reference to FIGS. 8-9, the tab 802 pivotally moves in an upward and downward trajectory and is situated directly adjacent to and underneath the cavity 39. Additionally, though not illustrated, a spring can be disposed within the housing 32 of the adapter 30 and is arranged so as to reside between the button 801/tab 802 and the adapter 30. Furthermore, the spring is configured so as to compress and decompress as a function of the button 801 and tab 802 mechanism. Moreover, the tab's 802 pivotal movement is dependent on and controlled by the button 801 and thereby, the state of compression of the spring.

Specifically, when the button 801 is not pressed, the spring (not illustrated) remains in a decompressed state and the tab 802 extends upwards so as secure the connection point 62 within the cavity 39. For example, the tab 802 can extend upwards to encapsulate the ball 702 received in the cavity 39 and thereby provide integral support for the connection experienced therebetween. Conversely, upon depression of the button 801, the spring (not shown) compresses and the tab 802 pivots downwardly. In this state, the tab 802 is no longer protruding upwards so as to secure the connection between the handheld showerhead 53 and the coupling structure 68 by its connection point 62. For example, when the tab 802 is no longer protruding upwards, it no longer encapsulates and provide support for the ball 702 received in the cavity 39. Various spring-loaded button and tab constructions for providing these capabilities can be selected by those skilled in the art.

Accordingly, as best illustrated in FIGS. 1-7, 10-12, 15-17, 19-21, 24-26, and 27-39, once the handheld showerhead 53 is properly engaged with the arm mount assembly 2, and the handheld showerhead 53 is operatively connected with the coupling structure 68 of the arm mount assembly 2, the handheld showerhead 53 is securely and movably engaged with the arm mount assembly 2. In this regard, and due to the ball and socket mechanism of the coupling structure 68 and connection end 62, the handheld showerhead 53 is capable of further pivoting in different directions, so as to be able to spray water throughout a shower stall, as desired by the bather.

The present shower assembly provides an arm mount assembly 11 for holding a handheld shower assembly 1. Advantageously, the arm mount assembly allows the bather to controllably adjust the positioning of the handheld showerhead so as to provide a wide range of movement, rotation, panning, swiveling, and tilting along multiple axes. Also advantageously, the arm mount assembly allows the bather to couple the arm mount assembly with the handheld showerhead at various positions so as to allow the user to orient the handheld showerhead in different directions and spray water at different trajectories in a shower stall.

While preferred showerhead assemblies have been illustrated and described, it will be apparent that various modifications can be made without departing from the spirit and scope of the invention. Alternative embodiments may be envisioned by those skilled in the art after consideration of the present disclosure. Accordingly, it will be apparent that various modifications can be made without departing from the spirit and scope of the invention.

It will be understood by those of skill in the art that any of the showerhead assemblies described herein, are meant to be illustrative only, and that the individual elements, or any combination of elements, depicted and/or described for a particular embodiment or figure are freely combinable with any other element, or any combination of other elements, depicted and/or described with respect to any of the other embodiments.

Accordingly, it is not intended that the invention be limited except by the following claims. Having described my invention in such terms to enable a person skilled in the art to understand the invention, recreate the invention, and practice it, and having identified the presently preferred embodiments thereof, I claim:

I claim:

1. A handheld showerhead assembly comprising:
a handheld showerhead comprising a hollow handle, a front face and a plurality of nozzles projecting from said front face, said hollow handle comprising a proximal end and a distal end with said distal end affixed to said handheld showerhead, said handheld showerhead further comprising a channel connecting said hollow handle's proximal end to said nozzles for transporting water received from said handle's proximal end to said nozzles;
a hose having a first end and a second end, wherein said first end is configured to operatively connect with said handheld showerhead and transport water thereto;
an arm mount assembly comprising:
a hollow coupler including a female threaded inlet for connecting to a pipe;
a first shoulder portion, a hollow second shoulder portion including a central conduit, and an arm portion coupled with said first shoulder portion by a first joint and said second shoulder portion by a second joint, wherein said arm portion is configured to move relative to said first joint and said second joint, said second shoulder connected to said coupler and said second shoulder including a shoulder outlet connected to said hose's second end;
wherein said shoulder outlet is in fluid communication with said hollow coupler through said central conduit; and
an attachment means for operatively coupling said arm mount assembly to said handheld showerhead, wherein said attachment means includes an arm mount engagement surface formed on said first shoulder portion, wherein said attachment means further includes a showerhead mount engagement surface formed on said handheld showerhead, and wherein said arm mount engagement surface is complementary to said showerhead engagement surface and is configured to operatively couple said arm mount assembly with said handheld showerhead.

2. The handheld showerhead assembly of claim 1, wherein said second shoulder portion is connected to said coupler by a ball joint to permit said second shoulder to move relative to said coupler.

3. The handheld showerhead assembly of claim 1, wherein said handle's proximal end comprises said showerhead engagement surface, and wherein said arm mount assembly further comprises a collar configured to hold a portion of said handle's proximal end comprising said showerhead engagement surface, and wherein said arm mount assembly operatively couples with said handheld showerhead by said collar holding said portion of said handle's proximal end.

4. The handheld showerhead assembly of claim 1, further comprising a cavity including said showerhead engagement surface, wherein said showerhead engagement surface comprises a first magnet, wherein said arm mount engagement surface comprises a second magnet configured to connect with said first magnet, and wherein said arm mount assembly operatively couples with said handheld showerhead by magnetic attraction of said first magnet to said second magnet.

5. The handheld showerhead assembly of claim 4, further comprising an adapter operatively coupled with said handheld showerhead, wherein said cavity is disposed within said adapter.

6. The handheld showerhead of claim 4, wherein said cavity is disposed with a rear side of said handheld showerhead.

7. The handheld showerhead assembly of claim 1, wherein said showerhead engagement surface includes a cavity and said arm mount engagement surface includes a ball, wherein said ball extends from said arm mount assembly and is configured to releasably engage within said cavity, and wherein said arm mount assembly operatively couples with said handheld showerhead by engagement of said ball with said cavity.

8. The handheld showerhead assembly of claim 7, wherein said cavity comprises a tension pin extending axially from said showerhead engagement surface, wherein said tension pin engages with said ball to maintain said arm mount assembly coupled with said handheld showerhead in a predetermined position.

9. The handheld showerhead assembly of claim 7, wherein said cavity is disposed on a rear side of said handheld showerhead.

10. The handheld showerhead assembly of claim 7, further comprising an adapter operatively coupled with said handheld showerhead, wherein said cavity is disposed on said adapter.

11. The handheld showerhead assembly of claim 1, wherein said attachment means comprises one or more hook portions and one or more loop portions, wherein said one or more hook portions are disposed on said arm mount engagement surface, and wherein said one or more loop portions are disposed on said showerhead engagement surface, wherein said arm mount assembly operatively couples with said handheld showerhead by attachment of said one or more hook portions to said one or more loop portions.

12. The handheld showerhead assembly of claim 1, wherein said arm portion is further configured to move in an upward, downward, forward, and backward direction.

13. The handheld showerhead assembly of claim 1, wherein said arm portion is positioned between said first joint and said second joint.

\* \* \* \* \*